US012750274B2

(12) United States Patent
Lal

(10) Patent No.: US 12,750,274 B2
(45) Date of Patent: Sep. 29, 2026

(54) SYSTEMS AND METHODS FOR OPTIMIZATION OF SERVICES PROVIDED OVER AN IN-PREMISE NETWORK

(71) Applicant: Adeia Guides Inc., San Jose, CA (US)

(72) Inventor: Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 21 days.

(21) Appl. No.: 18/899,374

(22) Filed: Sep. 27, 2024

(65) Prior Publication Data

US 2026/0095371 A1 Apr. 2, 2026

(51) Int. Cl.
*H04L 41/0686* (2022.01)
*H04L 47/762* (2022.01)
*H04L 47/80* (2022.01)

(52) U.S. Cl.
CPC ........ *H04L 41/0686* (2013.01); *H04L 47/762* (2013.01); *H04L 47/805* (2013.01)

(58) Field of Classification Search
CPC .. H04L 47/762; H04L 47/805; H04L 41/0686
See application file for complete search history.

(56) References Cited

U.S. PATENT DOCUMENTS

2014/0349763 A1 11/2014 Lanzoni et al.
2015/0249625 A1* 9/2015 Jensen .................... H04L 51/06 709/206
2019/0380065 A1 12/2019 Kim et al.
2020/0014766 A1* 1/2020 Bugenhagen ............ H04Q 9/00
2023/0171527 A1 6/2023 Vinayagam et al.

FOREIGN PATENT DOCUMENTS

WO 2023/121301 A1 6/2023

OTHER PUBLICATIONS

"ARC Hotspot: An Alternative to Manual Connectivity Troubleshooting," Kyrio, available online at https://kyrio.com/arc-hotspot/, Sep. 8, 2022, 5 pages.
"Install Mosquitto MQTT Broker on Raspberry Pi," Random Nerd Tutorials, available online at https://randomnerdtutorials.com/how-to-install-mosquitto-broker-on-raspberry-pi/, Jun. 10, 2022, 126 pages.

(Continued)

*Primary Examiner* — Todd L Barker
(74) *Attorney, Agent, or Firm* — HG Law LLP

(57) ABSTRACT

Systems and methods are provided for identifying a first device connected to a local area network (LAN) at a location. The first device implements a publish-subscribe model in which event information comprising a current network parameter in relation to a service provided by the first device via at least one of the WAN or the LAN is published and received by at least one device of a plurality of devices that is subscribed to receive data related to the event information. The publish-subscribe model may be used to generate and publish an indication related to the current network parameter. A second device implementing the publish-subscribe model receives the indication based on being subscribed to data published for the service, and the second device performs an action based on the indication.

20 Claims, 13 Drawing Sheets

(56) References Cited

OTHER PUBLICATIONS

"Start a Quad Play MVNO (Mobile Brands) Integrating other Communication Channels," MVNO Index, available online at https://mvno-index.com/quad-play-mvnos-integrating-communication-channels-4/, 27 pages.

"The Evolution of Quad-Play Services," Luke Keohe, accessed online at http://www.lukekehoe.com/the-evolution-of-quad-play-services.html, Aug. 21, 2018, 10 pages.

"What is Pub/Sub Architecture?," Geeksforgeeks, available online at https://www.geeksforgeeks.org/what-is-pub-sub/, Oct. 22, 2024, 17 pages.

"What is Pub/Sub? The Publish/Subscribe model explained," Ably, available online at https://ably.com/topic/pub-sub, May 3, 2023, 11 pages.

Bradshaw, J., "Telecommunication in Healthcare: Improving Patient Care and Connectivity," Zeus Cloud, available online at https://www.zeuscloud.co.uk/blog/telecommunication-in-healthcare, 2023.

Devreese, T., "Quint Plays: The Smart (Home) Move for SPs," Light Reading, available online at https://www.lightreading.com/iot/quint-plays-the-smart-home-move-for-sps, Feb. 26, 2018, 13 pages.

Richmond, C., "Able to Set Priority of SSIDs to Have Dynamic Throttling?," Ruckus, available online at https://community.ruckuswireless.com/t5/Access-Points-Indoor-and-Outdoor/Able-to-Set-Priority-of-SSIDs-to-Have-Dynamic-Throttling/m-p/37882, Aug. 3, 2016, 5 pages.

Thomas, R., et al., "Blockchain: A technical primer," Deloitte Insights, available online at https://www2.deloitte.com/content/dam/insights/us/articles/4436_Blockchain-primer/DI_Blockchain_Primer.pdf, 2018, 10 pages.

* cited by examiner

SYSTEMS AND METHODS FOR OPTIMIZATION OF SERVICES PROVIDED OVER AN IN-PREMISE NETWORK

BACKGROUND

This disclosure is directed to systems and methods for optimizing services provided over an in-premise network.

SUMMARY

Telecommunication operators often offer bundles of subscription products to their customers. While many smaller operators still offer only a "triple play" of products, viz., voice, video and Internet (broadband), more innovative operators have augmented their bundles with other services as well, such as, for example "quad play" bundle of voice, video, broadband and mobile, or even "quint play" bundles of voice, video, broadband, mobile and smart home services. Operators in various regions and geographies have also trialed or offered other services such as telemedicine or other healthcare related communication solutions.

However, these services often operate in silos. Internet service providers (ISPs) may invest in unified customer relationship management (CRM) platforms, cross-channel billing systems, and virtual network functions (VNFs) riding on common computing platforms to facilitate seamless delivery and economies of scale across all services. However, they leave much to be desired for delivering an integrated experience from the point of view of their customers, who often are more concerned about the specific services that they have subscribed to, rather than backend technologies and economies of scale for the operator. There is a need for an improved mechanism for devices and/or services provided on an in-premise network to efficiently communicate and track historical network data, to enable dynamic allocation of network resources in response to the needs of current network traffic, and to facilitate troubleshooting when issues occur in the network.

As cable operators have transitioned to become mobile virtual network operators (MVNOs) by leveraging partner 5G mobile networks from mobile network operators, they have the option to serve broadband to customers via fixed wireless. In one approach, cable operators automatically set up a mobile hotspot in the home in response to a wired broadband outage, providing connectivity to all the devices in the home by setting up a bridge between the mobile device and the Wi-Fi router. While this is a useful approach, may MVNOs pay a variable (tiered) amount to mobile network operators based on the amount of mobile data consumed by their customers during a billing period. If all devices within the home continue to operate without interruption during the outage using the wireless network facilitated by the mobile hotspot network, then a significant amount of mobile data may be consumed during the outage, driving up costs (e.g., of expending processing and/or network resources) for the wired broadband MVNO operator. Thus, there is a need for in-premise service optimization in a scenario in which dynamic network reconfiguration is employed during a broadband outage, to provide a technical solution to cause only the most important connectivity needs to be served, and/or preferentially treat certain network traffic, when leveraging a mobile network during a wired broadband outage.

To help overcome these problems, systems and methods are provided for identifying a first device connected to a local area network (LAN) at a location, wherein the LAN transmits data to and receives data from a wide area network (WAN), and wherein the first device implements a publish-subscribe model in which event information related to at least one of the WAN or the LAN is published by a device of a plurality of devices implementing the publish-subscribe model and connected to the LAN and is received by at least one device of the plurality of devices that is subscribed to receive data related to the event information. The disclosed systems and methods may identify event information comprising a current network parameter in relation to a service provided by a first device via at least one of the WAN or the LAN. The disclosed systems and methods may generate and publish on the LAN, using the publish-subscribe model, an indication related to the current network parameter, wherein a second device of the plurality of devices implementing the publish-subscribe model receives the indication based on being subscribed to data published for the service being provided by the first device, and the second device is caused to perform an action based at least in part on the indication.

Such aspects, by employing a publish-subscribe architecture for different services from an operator that are often only loosely coupled, e.g., can run independently, but nonetheless may benefit from coupling under certain conditions, enable devices implementing the publish-subscribe model to independently make decisions that drive multi-service quality of experience (QoE) optimizations. Such conditions may arise during interruption or abnormal functioning, or they may be driven by the service provider to drive dynamic policies within the customer premise without explicit backend communication between different services. Moreover, implementing the services on ISP devices inside the home, e.g., including storing historical data and interactions for the LAN locally in-premise, may conserve storage in an ISP's cloud storage. For example, a historical ledger may be provided that maintains history of various events that occur in the home, which may be used by a technician or a customer service agent to troubleshoot service issues within the home, as well as input to an inference/policy engine belonging to a specific service provided in the LAN. Further, bandwidth may be conserved and efficiently allocated based on the dynamic publishing of real-time updates between publishers and subscribers within the LAN. In some embodiments, dynamic policies may be enforced, e.g., to modify network traffic to a device, or block traffic to a device, or treat certain services preferentially within the LAN.

In addition, to help overcome the problems with respect to service interruption during a broadband outage, systems and methods are provided for optimizing in-premise services provided after a dynamic network reconfiguration. The system and methods may be configured to identify a first device providing a service in an LAN at a location, wherein a server transmits data for providing the service to the LAN via a first WAN using a first amount of bandwidth, and wherein networking equipment in the LAN is configured to provide the data transmitted by the server to the first device, and wherein a mobile device is connected to the LAN and is connected to a cellular network. The disclosed systems and methods may detect an outage in the first WAN that interrupts the transmitting of the data by the server to the LAN via the first WAN. Based at least in part on detecting the outage, the disclosed systems and methods may cause the mobile device to utilize the cellular network to provide a mobile hotspot at the location, wherein the mobile hotspot provides a second WAN, while also establishing a bridge communication link between the mobile device and the networking equipment to enable the first device to receive, via the networking equipment, data transmitted over the second WAN. During the outage of the first WAN, the disclosed systems and methods may cause the service to be provided by the first device via the second WAN and with the bridge communication link using a second amount of bandwidth that is less than the first amount of bandwidth used to provide the service via the first WAN prior to the outage, based on determining that the server is transmitting data for providing the service using the second WAN instead of the first WAN. In some embodiments, the systems and method disclosed herein may provide for the creation of a new network SSID such that separate policy considerations may be applied to devices admitted to the new network SSID, as opposed to other home devices that continue to be connected to the original home SSID with a WAN path via the bridge communication link.

Such aspects may enable reducing WAN bandwidth when a failover to mobile broadband occurs, e.g., using a publish-subscribe model, to treat certain services preferentially when bandwidth may be more at a premium, and to conserve bandwidth overall, e.g., to avoid going over an, often relatively limited, data cap for cellular data, and/or to avoid overloading the cellular network. In some embodiments, the disclosed systems and methods may enable multiple devices across a multitude of services to join a new SSID to improve quality of service (QOS) for its own services, while applying QoS reduction only to miscellaneous Wi-Fi router-connected devices, which may utilize the publish-subscribe model due to the often loose coupling of different services.

In some embodiments, a message broker/publisher-subscriber system may be implemented that ensures event information from one service (the publisher) is propagated in real-time to another service (the subscriber) to improved customer experience by tackling dependencies and performing global optimization across shared resources. The subscribing service may use an inference and/or policy engine to collect event data from other services for self-optimization or customer experience improvement, to help deliver a seamless experience and optimized delivery across various operator services on the customer premises.

In some embodiments, the first device is networking equipment, and wherein the LAN is provided at least in part by the networking equipment. In some embodiments, the indication indicates that a signal strength between the networking equipment and the second device is below a threshold.

In some embodiments, the indication is an error that is causing an interruption to a service provided by the second device via at least one of the WAN or the LAN, and the action comprises causing display of a description of the error.

In some embodiments, the action comprises reducing an amount of bandwidth being used to provide a service via the second device in the LAN. In some embodiments, the indication related to the current network parameter indicates that the service being provided by the first device is time-sensitive, and a portion of the bandwidth previously used by the second device prior to the reducing is allocated to the first device. In some embodiments, the service being provided by the first device is treated preferentially as compared to the service being provided by the second device based at least in part on a preference of a user associated with the location. In some embodiments, the first device is a mobile device, and the first device is transitioning from providing the service via a cellular network to providing the service in the LAN, and a portion of the bandwidth previously used by the second device prior to the reducing is allocated to the first device.

In some embodiments, the disclosed systems and methods may access a database comprising historical data in relation to the plurality of devices connected to the LAN, wherein the historical data comprises previous indications published using the publish-subscribe model, and wherein the action is performed further based at least in part on a portion of the historical data related to the second device and a service provided by the second device. In some embodiments, networking equipment is provided by a first entity, the second device is provided by a second entity, and the database is a distributed ledger, and wherein writing to the distributed ledger by the first entity or the second entity requires use of a consensus algorithm.

In some embodiments, the service is a content recommendation service, and when the service is being provided by the first device in the LAN based on the data transmitted via the first WAN, a first number of content recommendations is provided at a user interface of the first device. In some embodiments, when the service is being provided by the first device in the LAN based on the data transmitted via the second WAN, a second number of content recommendations is provided at the user interface of the first device, wherein the second number of content recommendations is less than the first number of content recommendations In some embodiments, the disclosed systems and methods further comprise using a publish-subscribe model to publish the outage to at least one device in the LAN, wherein causing the mobile device to utilize the cellular network to provide the mobile hotspot at the location, and establishing the bridge communication link, is based at least in part on the using of the publish-subscribe model to publish the outage to the at least one device in the LAN. In some embodiments, the networking equipment uses the publish-subscribe model to publish the outage to the mobile device.

In some embodiments, prior to detecting the outage of the first WAN, each of a plurality of devices is connected to the LAN based on a first service set identifier (SSID). The disclosed systems and methods may further comprise, after detecting the outage of the first WAN, selectively publishing, using a publish-subscribe model, data indicating a second SSID to a first subset of the plurality of devices that are associated with a same entity as the networking equipment, and refraining from publishing the data associated with a second SSID to a second subset of the plurality of devices that are not associated with the same entity as the networking equipment, wherein the first device is included in the second subset of the plurality of devices. In some embodiments, during the outage of the first WAN, the disclosed systems and methods may cause network traffic associated with the second SSID to treated preferentially with in relation to network traffic associated with the first SSID.

In some embodiments, the service is a first service, and the disclosed systems and methods further comprise publishing an indication, using the publish-subscribe model, that, during the outage of the first WAN, a second service being provided by a second device in the LAN is to be treated preferentially in relation to the first service. The disclosed systems and methods may further comprise identifying a third amount of bandwidth based on a difference between the first bandwidth and the second bandwidth and allocating at least a portion of the third amount of bandwidth to the second service. In some embodiments, the second service is treated preferentially with respect to the first service based at least in part on a preference of a user associated with the location.

In some embodiments, the mobile device is a first mobile device and a second mobile device is connected to the LAN prior to the outage, and the outage is published to the first and second mobile devices, and wherein the first mobile device is used to provide the mobile hotspot based on having superior connectivity characteristics relative to the second mobile device, such as, for example, signal strength and/or bandwidth) networking equipment than the second mobile device.

In some embodiments, causing the service to be provided by the first device via the second WAN using the second amount of bandwidth that is less than the first amount of bandwidth is based at least in part on at least one of a bandwidth associated with the mobile hotpot or a data cap associated with the mobile hotspot.

In some embodiments, the networking equipment is provided by a first entity, the at least one device is provided by a second entity, and a particular device is provided by the first entity, the method further comprising based on the particular device being provided by a same entity as the first entity, refraining from modifying a service being provided by the particular device via the networking equipment based on the mobile hotspot.

In some embodiments, causing the service to be provided by the first device via the second WAN using the second amount of bandwidth that is less than the first amount of bandwidth is based at least in part on at least one of a bandwidth associated with the mobile hotpot or a data cap associated with the mobile hotpot.

In some embodiments, the service is a video streaming service providing video, and causing the service to be provided by the first device via the second WAN using the second amount of bandwidth that is less than the first amount of bandwidth comprises causing at least one of a bitrate or resolution of the video to remain below a threshold.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
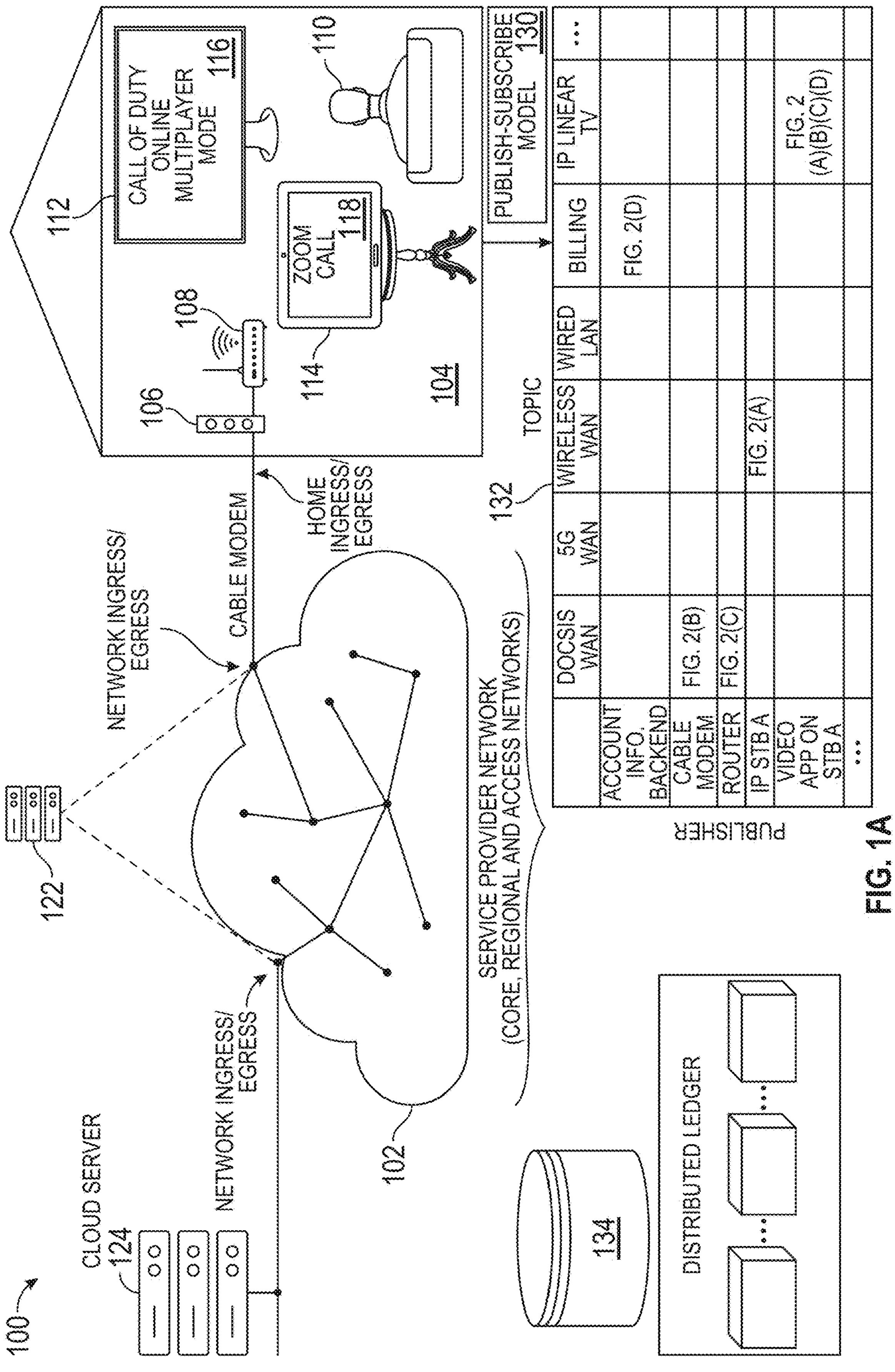
FIGS. 1A-1C show an illustrative system for providing a publish-subscribe model in an LAN to perform actions based on published indications, in accordance with some embodiments of this disclosure.

FIG. 1A shows an illustrative system for providing a publish-subscribe model in an LAN to perform actions based on published indications, in accordance with some embodiments of this disclosure. System 100 may comprise service provider network 102, physical location 104 (e.g., a home of user 110, a place of business, a school, or any other suitable location, or any combination thereof), networking equipment 106 and 108 (e.g., a modem, router, switch, gateway, wireless access point, mesh access point, extender, hub, any other suitable networking equipment, and/or any suitable combination thereof), networking equipment 122 (e.g., a backbone or carrier router or CMTS other suitable networking equipment), devices 112 and 114, and/or any other suitable components. System 100 may comprise any suitable combination of hardware and/or software to provide the functionalities described herein. Cloud server 124 may be a server associated with the ISP and/or service provider network, or may be, for example, a server associated with a provider of services or content (e.g., a service provider that provides and/or facilitates access to video call 118 or video game 116).

In some embodiments, system 100 may be implemented at least in part by streaming, cable, Internet of things (IOT) providers, home security and automation providers, Internet service provider (ISP), and telecommunication operators, and/or at large, siloed organizations by allowing departments to take accountability for their portion of a global specification that describes events created and consumed by various services.

Service provider network 102 may include, for example, any suitable software and/or hardware (e.g., networking equipment, servers, and/or databases) and/or any suitable infrastructure (e.g., physical cable transmission lines, fiber-optic transmission channels or mediums or channels, satellites) to provide core, regional, access networks and/or backhaul (and/or any other suitable portion of the network) of one or more ISPs, to facilitate a telecommunications network. In some embodiments, the ISP may be provided by a business or other organization that provides access to the Internet for a fee. For example, service provider network 102 may correspond to or comprise a WAN, to facilitate Internet connectivity (or connectivity over any other suitable public or private network) between networked devices worldwide or over any other suitable geographic region or location(s), to enable such devices to exchange information and resources. In some embodiments, a WAN or service provider network 102 may be used to connect LANs (and/or other types of communication) to enable electronic communications between remotely located devices. In the example of FIG. 1A, the LAN may be a small-scale network for data exchange between a group of computers or other devices at a single location, provided at location 104 by way of networking equipment 106 and/or 108. Service provider network 102 may provide broadband, high-bandwidth Internet access.

In some embodiments, networking equipment 122 and cloud server 124 may be located remote from location 104. The devices, servers, and networking equipment of system 100 may communicate over a wired connection and a wireless connection. For example, devices 112, 114 and networking equipment 106 and 108 may be equipped with antennas for transmitting and receiving electromagnetic signals at frequencies within the electromagnetic spectrum, e.g., radio frequencies, to communicate with each other over a network in a localized area. The network within location 104 may correspond to, e.g., a wireless fidelity (Wi-Fi) network, such as, for example, 802.11n, 802.11ac, 802.11ax, Wi-Gig/802.11ad, 802.11 (Wi-Fi 7) at a fronthaul of a telecommunications network, to provide wireless networking technology allowing electronic devices to connect to one another and/or the Internet from a shared network access point.

The devices of system 100 may communicate over a wired LAN and/or may communicate wirelessly over a wireless LAN (WLAN) and to transmit data to and receive data from the Internet, and may be present within an effective coverage area of the localized network. The Internet is a global system of interconnected computer networks and devices employing common communication protocols, e.g., the transmission control protocol (TCP), user datagram protocol (UDP) and the Internet protocol (IP) in the TCP/IP or UDP/IP suite.

Router 108 may be configured to forward or route data packets from the Internet connection, received by way of modem 106, to devices within the localized network of system 100 and receive data packets from such devices. In some embodiments, router 108 may include a built-in modem to provide access to the Internet for the household (e.g., received by way of cable or fiber connections included in backhaul portions of a telecommunications network), built-in switches or hubs to deliver data packets to the appropriate devices within the Wi-Fi network, built-in access points to enable devices to wirelessly connect to the Wi-Fi network, and/or system 100 may include one or more stand-alone modems, switches, routers and access points. In some embodiments, modem 106 and/or router 108 may be leased from and/or installed at location 104 (e.g., the customer's premises) by the ISP as part of a managed Wi-Fi install, to give service provider network 102 visibility into LAN and WAN network traffic associated with data transmitted to or received from modem 106 of location 104.

In some embodiments, one or more applications and/or media assets may be provided to user 110 by way of wired or wireless signals transmitted through the LAN at location 104. For example, user 110 may be provided media content (e.g., a live content, on-demand content, an online video game such as, for example, Call of Duty indicated at 116, immersive content, extended reality (XR) content, or any suitable content, or any combination thereof) via device 112 and/or a video game console, each of which may be connected to the Internet via the LAN within location 104 to provide such content. As another example, tablet 114 may additionally or alternatively be connected to the Internet via modem 106 and router 108 of the LAN to provide a video conferencing application (e.g., Zoom) 118 to user 110.

In some embodiments, devices 112 and 114 may be, for example a headset; a mobile device such as, for example, a smartphone or tablet; a laptop computer; a personal computer; a desktop computer; a smart television; a smart watch or wearable device; smart glasses; extended reality (XR) head-mounted display (HMD); a stereoscopic display; a wearable camera; XR glasses; XR goggles; a near-eye display device; a robot; an autonomous cleaning device; or any other suitable user equipment or device capable of connecting to the Internet or other suitable network; or any combination thereof.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with or are overlaid on the real world.

As shown in FIG. 1A, system 100 may implement a publish-subscribe model 130. In some embodiments, publish-subscribe model 130 may be implemented on one or more devices at location 104, e.g., inside the home. For example, any suitable computing device or ISP device connected to the LAN (e.g., networking equipment 106, 108 and device 112, 114), having suitable memory, compute, and/or communication capabilities, may implement publish-subscribe model 130, and any of such devices may be chosen as a central device for publish-subscribe model 130. Publish-subscribe model 130 may be a message broker/publisher-subscriber system that ensures event information from one service (the publisher) is propagated in real-time to another service (the subscriber) to enable one or more device to perform one or more actions that improve the customer experience by tackling dependencies and performing global optimization across shared resources. Such message may be indirectly exchanged between devices, e.g., each message may be associated with a topic, and the topic (e.g., via publish/subscribe message broker 162) may act as an intermediary channel between senders and receivers, and maintain a list of receivers who are interested in messages about that topic. For example, at least one device in the premises of location 104 may publish a message on a particular topic, and each device in location 104 that subscribes to that topic receives the message. In some embodiments, the publisher may be outside the LAN, e.g., systems and services on the ISP end (e.g., networking equipment 122 associated with the service provider network may publish a message to the LAN) or other content provider (e.g., cloud server 124) may publish a message to the LAN. In some embodiments, the message may only to be sent (e.g., over the LAN or over another suitable wireless network protocol) to devices that are subscribed to the topic (e.g., as determined by publish/subscribe message broker 162), or the message may be broadcast (e.g., over the LAN or over another suitable wireless network protocol) to all devices, where devices that are not subscribed to the topic may discard or ignore the message. In some embodiments, publish-subscribe model or service 130 may use an inference and/or policy engine to collect event data from other services for self-optimization or customer experience improvement, and to help conserve computing and/or networking resources of the LAN and/or WAN. Publish-subscribe model may be an architecture that is applied inside the residential premise across multiple ISP devices belonging to multiple services.

Figure 1B:
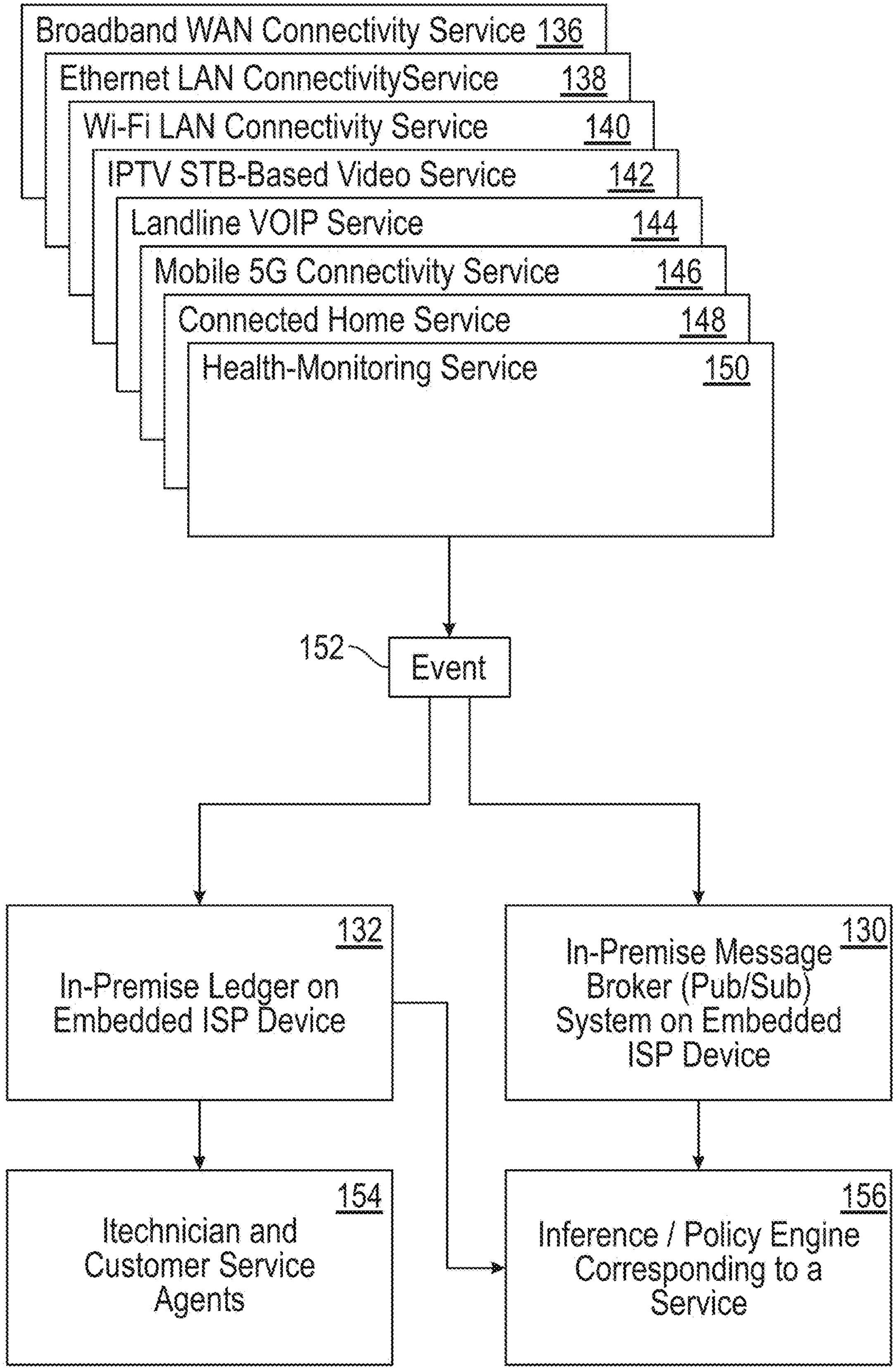

Publish-subscribe model 130 may be used to help deliver a seamless experience and optimized delivery across various operator services on the customer premises. As shown in FIG. 1B, an illustrative (non-exhaustive, non-limiting) list of such services (e.g., provided by one or more of devices 106, 108, 112, 114, 122, and/or 124) may include broadband WAN Connectivity Service 136, ethernet LAN connectivity service 138, Wi-Fi LAN connectivity service 140, Internet Protocol television (IPTV) Set-top Box (STB)-based video service 142, landline voice over Internet protocol (VOIP) service 144, mobile 5G connectivity service 146, connected home service 148, and health-monitoring service 150. Broadband WAN Connectivity Service 136 may be used to ensure that an Internet signal is present at cable modem 106 (or a fixed wireless access modem) and downstream to a customer router 108, and may ensure that a bandwidth service level agreement (SLA) is met in upstream and/or downstream directions.

Wired LAN connectivity service 138 may help ensure that communication between a customer router 108 and any downstream wired device (e.g., connected via Ethernet, Multimedia over Coaxial Alliance (MoCA) or any suitable connection) is active and meets a subscriber SLA. IPTV STB-based video service 142 may ensure content is available at any device connected to an IP STB from the operator. Landline VoIP Service 144 may ensure any landline telephone adapter and VoIP phone is active and available per subscriber SLA. Mobile service 146 may ensure any mobile device activated on the operator mobile network (operator owned or contracted, such as, for example, a virtual network operator) is active and available per subscriber SLA. Connected home service 148 may ensure any home security and/or home automation features and functions delivered by one or more of connected home devices (e.g., sensors, cameras, thermostats, lights, locks, alarms, voice assistants, and/or any other suitable devices) are active and available per subscriber SLA. Health-monitoring service 150 may ensure any health-monitoring related service, such as, for example, upload of device data/communication with a health provider, detection of anomalies in "activities of daily living" (ADL) for independent-living seniors, and/or any other suitable health-related data, is active and available per subscriber SLA.

In some embodiments, a service may comprise logical modules running across one or more ISP devices. For example, an IPTV STB-based video service may be activated on multiple devices. In some embodiments, a service may be an atomic unit of a business product. For example, broadband WAN connectivity service 136, Ethernet LAN connectivity service 138, and Wi-Fi LAN connectivity service 140 may together form the broadband product offered to the customer. Similarly, a mobile business service/product may comprise mobile 5G Connectivity Service 146, the broadband WAN connectivity service 136, and the Wi-Fi LAN connectivity service 140, while the (wired) voice product may be comprised of the broadband WAN connectivity service 136 and landline VOIP service 144.

As shown at 152, each service may publish events that may be of interest, be valuable to, or otherwise impact the provision of other services (e.g., cause the other services to modify behavior in an effort to provide optimization or performance improvement), while each service also subscribes to other services publishing event data that is relevant to, for example, optimization or performance improvement of itself. In some embodiments, the event data may also be maintained in a historical ledger/database (which may be stored in-premise at location 104, or remote from location 104), as shown at 134, and may be retrieved and made available to a technician, service agent, or the customer for troubleshooting. In some embodiments, each of historical data, as well as real-time published event data, is available to an inference or policy engine 156 associated with a service or group of services. Inference/policy engine 156 associated with a service (or group of services) may be responsible for implanting optimization or improvement of that service, e.g., based on data transmitted via the publish-subscribe model 130.

Figure 1C:
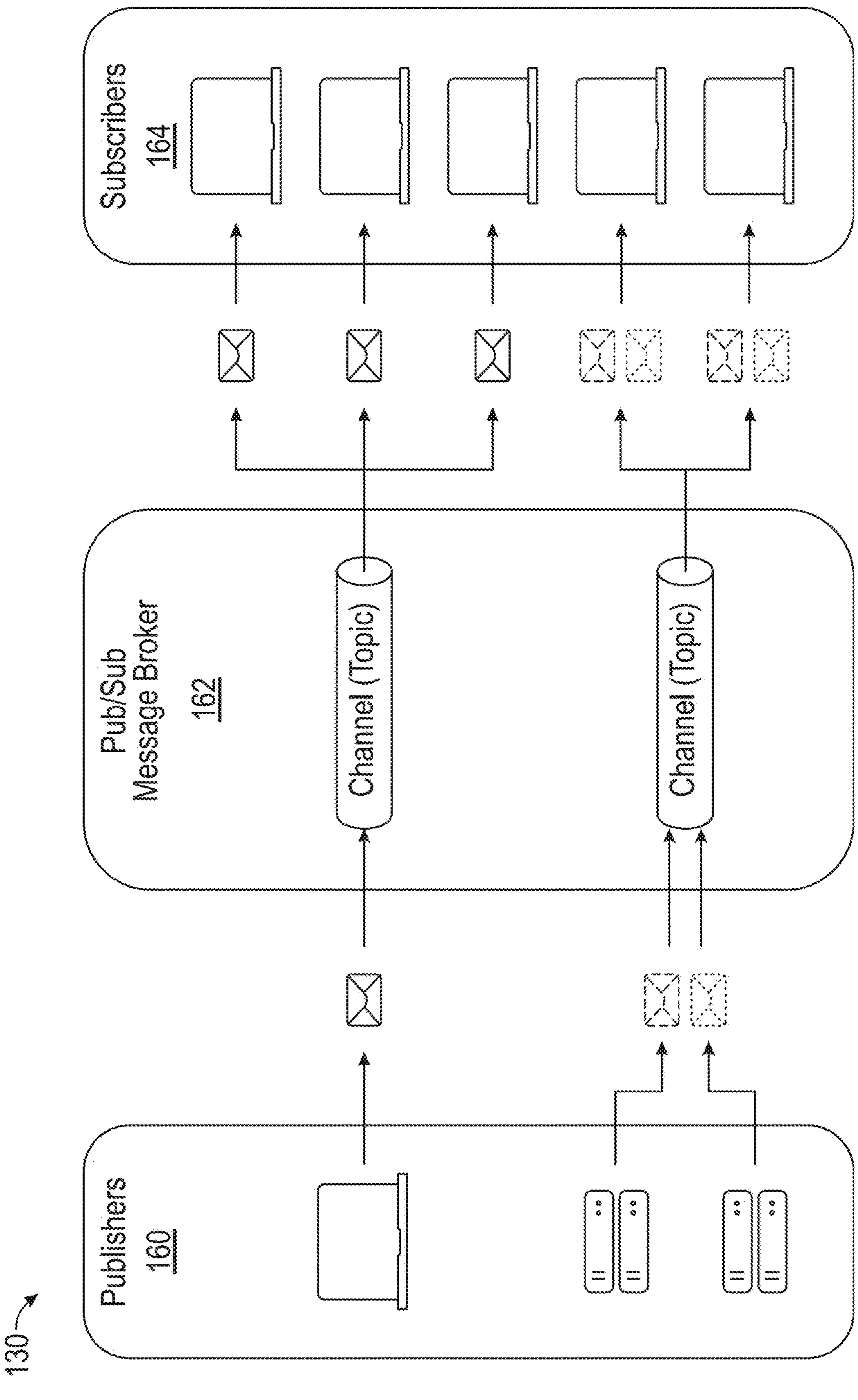

As shown in FIG. 1C, publish-subscribe design patterns, may be used in distributed systems for asynchronous communication between different components or services. Publish-subscribe's loose coupling, asynchronous nature, and inherent scalability may be used in distributed systems with a high and fluctuating number of publishers and subscribers, and lightweight publish-subscribe message broker systems may also be implemented in embedded devices. Publishers 160 (e.g., one or more of devices 106, 108, 112, 114 in the LAN of FIG. 1A) may utilize publish-subscribe message broker 162 to publish a message or other data related to a topic (e.g., a service interruption on the LAN of location 104) to subscribers (e.g., one or more of devices 106, 108, 112, 114 in the LAN of FIG. 1A).

System 100 may employ a publish-subscribe architecture in part because different services from an operator are often only loosely coupled (run independently), though some services may utilize coupling under certain conditions. These conditions could arise during interruption or abnormal functioning, or they may be driven by the service provider to drive dynamic policies within the customer premise without explicit backend communication between different services. Devices subscribed to a topic in a publish-subscribe design pattern may independently make decisions that drive multi-service QoE optimizations.

Figure 2:
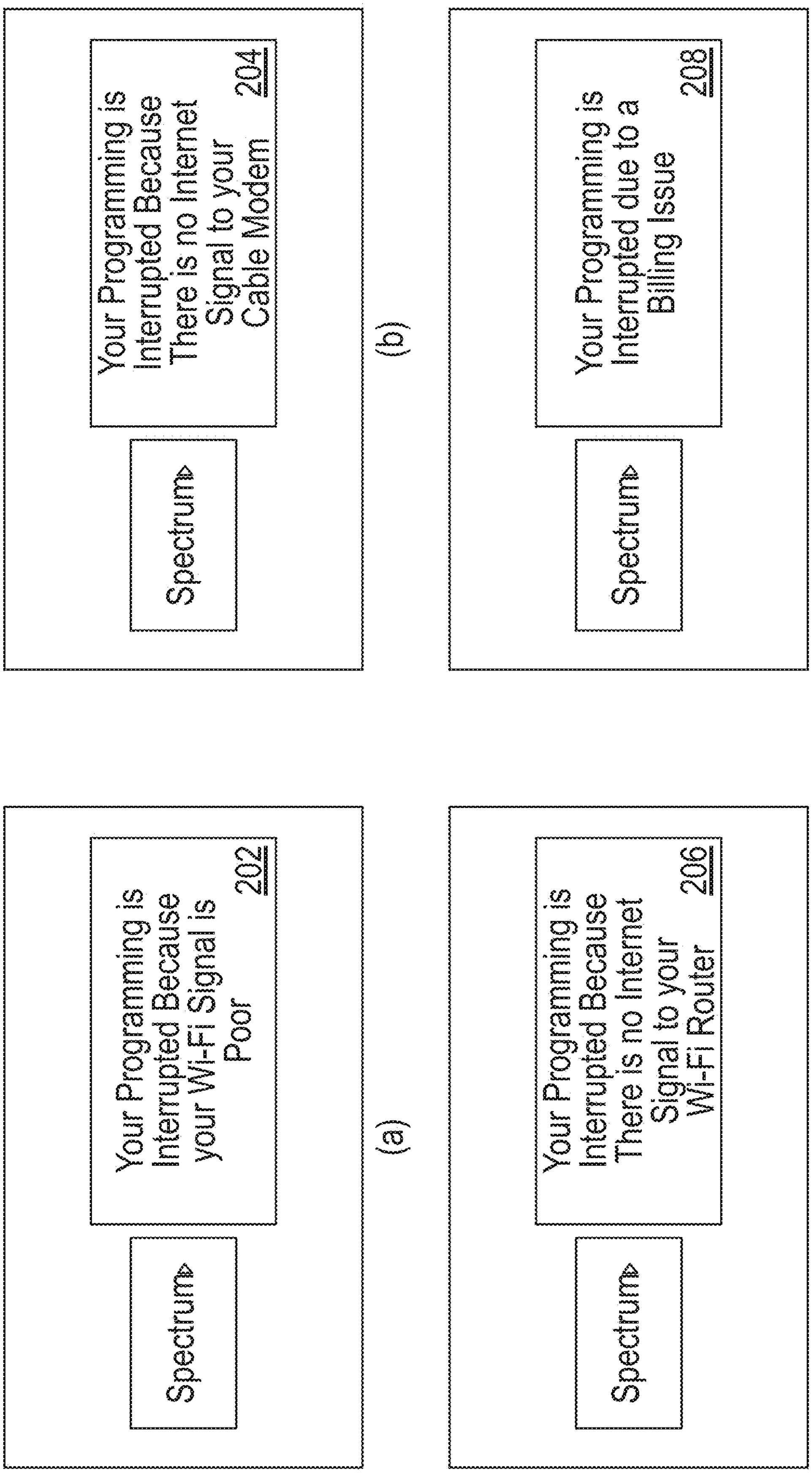
FIG. 2 show an illustrative user interface, in accordance with some embodiments of this disclosure.

As an example, publish-subscribe model 130 may facilitate the transmission of data between devices on an LAN in relation to a service interruption, to cause one or more subscribing devices (and/or the publishing device) to perform an action. In some embodiments, such service interruption may be handled by messaging the customer to improve their troubleshooting experience (e.g., by providing critical information), or by reactively reconfiguring one or more network devices in the home to overcome the service interruption altogether. As shown in FIG. 2(*a*)-2(*d*), system 100 may provide a user or customer (e.g., user 110 of FIG. 1A) with information regarding a cause of the service interruption or troubleshooting tip. For example, FIG. 2 shows system 100 providing a user with an improved experience, if, while watching IPTV video on a STB-connected TV or other suitable device, their programming is interrupted. Publish-subscribe model 130 may be used to communicate a message indicating a specific cause of the interruption of programming to the customer.

For example, as shown in FIG. 2(*a*), the Wi-Fi signal strength in the LAN at the display device (STB), e.g., device 112, may be known to the wireless router, and such signal strength may be published by the wireless connectivity service (e.g., service 136, 138, and/or 140 of FIG. 1B, which may be implemented on, for example, router 108 in the LAN) and subscribed to by video service 142 of FIG. 1B (e.g., implemented at least in part on device 112 of FIG. 1A).

Thus, when an interruption in playout (e.g., buffering condition) is encountered, the inference/policy engine 156 for video service 142 of FIG. 1B may infer, and generate for output indication 202, that the low signal strength is the reason for the interrupted playout.

FIG. 2(*b*) shows an indication 204 which may be provided for output in certain conditions, such as, for example, when WAN connectivity service 136 of FIG. 1B published an indication that there is no incoming signal at the cable modem (e.g., modem 106 of FIG. 1A). FIG. 2(*c*) shows an indication 206 which may be provided for output when there is no incoming broadband signal into the Wi-Fi router, published by LAN connectivity service 138 and/or 140 of FIG. 1B and subscribed to by video service 142. FIG. 2(*d*) shows an indication 208 which may be provided for output when a billing service provides an error code to video service 142 via publish-subscribe mechanism 130, thus leading to an inference and consequent messaging to the customer. Such messaging, as shown in FIG. 2, saves customers' time and effort in debugging, as well as reduces trouble or troubleshooting calls and resolution time for customer service agents.

Data structure 132 associated with publish-subscribe model 130 of FIG. 1A depicts data which may be stored for topics and publishers for the in-premise service interruption example of FIG. 2. As shown, any device (e.g., IP STB A) may report its signal strength (which may be, for example, queried by networking equipment 108 or another suitable device or service, or self-reported periodically to networking equipment 108 or another suitable device or service) on the "Wireless LAN" Topic, e.g., upon determining that the signal strength falls below a threshold or returns to above the threshold. If the video application 142 of FIG. 1B, e.g., implemented at IP STB A, as indicated in data structure 132 of FIG. 1A, experiences video service interruption, its inference engine 156 may receive, as a subscriber to the "Wireless LAN" topic, an indication that signal strength to the underlying STB A device is low. This allows video application 142 to deduce, and present to the consumer, a root cause of the service interruption, as shown in FIG. 2(*a*).

In another example, the cable modem 106 publishes on the "DOCSIS WAN" topic that the incoming signal is weak/disturbed. As a subscriber to this topic, the video application on IP STB A deduces that video is interrupted due to the poor data over cable service interface specification (DOCSIS) WAN signal, shown in FIG. 2(*b*). The example of FIG. 2(*c*) occurs when router 108 publishes a poor or absent incoming signal from cable modem 106 on the "DOCSIS WAN" Topic.

Even though many publishers may be in-home devices, in some embodiments, one or more backend systems may also be coupled into the publish-subscribe model 130 to avoid explicit API integration with a host of different systems. In the example of FIG. 2(*d*), a backend account information module publishes a subscriber billing issue. Video application 142 may then conclude that the service interruption is due to the billing issue. In some implementations, this may also be returned as an error code by the video service, e.g., if directly messaged by the video server). In some embodiments, the video application may, in turn, publish its service interruption on another topic such as, for example, "IP Linear TV." In the example of FIG. 2(*a*)-2(*d*), the wireless module of an IP STB may be decoupled from its video application in FIG. 2(*a*), while the billing backend was decoupled from any specific operator service in FIG. 2(*d*).

As shown in FIG. 1A, a database 134 may comprise a historical ledger maintaining a history of various events that occur in location 104 (e.g., a residential home), for use by a technician or a customer service agent to troubleshoot service issues within location 104. In some embodiments, data from database 134 may be used as input to an inference/policy engine 156 of FIG. 1B belonging to a specific service. Such troubleshooting, whether by a technician (e.g., employed by the ISP), customer service agent or even then customer, often relies on the historical ledger of key events related to operator services is troubleshooting. As an illustrative example, if a customer or technician is evaluating poor quality video on a 4K display device connected to a STB, the poor quality video may not be occurring at a certain time during the morning, but a closer look at the historical data can reveal that broadband connectivity (available downstream bandwidth) consistently degrades during certain peak hours between 6 pm and 10 pm. Further, the drop in downstream bandwidth may be significant enough to affect the 4K TV streaming app only in the evening hours when other devices within the customer home also compete for bandwidth. Such inferences can be made from historical data maintained in the customer premise on an embedded device.

Database 134 may be an efficient data structure storing historical data as a linked list (for dynamically allocated memory) or table/list (statically allocated memory). In some embodiments, when all the operator services are implicitly trustworthy, the operator may implement a proprietary architecture for the historical event ledger. In some embodiments, all the event messages related to a topic/channel in the publish-subscribe architecture deemed worthy of archiving are stored in the historical ledger. In some embodiments, a specific channel/topic may be used for directing messages to an archive, e.g., they are published to an event message store that is not deleted until another condition such as a memory threshold is reached.

In some embodiments, an operator may have an agreement with a partner service provider for sharing event data to ease QE optimization and troubleshooting. The shared data may include a common message broker system leveraged by a telecommunications service provider and its vendors/partners, as well as a common historical ledger. While communication using the publish-subscribe design pattern may be encrypted using agreed-upon keys between operator and vendor, in this scenario as between the telecommunications service provider and its vendors/partners, a blockchain-based "smart ledger" may be used to implement the historical event message store. A blockchain is an immutable, secured and a distributed ledger, and may be used to develop a shared data/transaction ledger in cases where different entities may not entirely trust each other. While reading of the data is "public" to those on the chain, modification of the data is secured by a consensus algorithm and an audit trail. For example, a blockchain historical ledger may be used when an operator markets a connected home service or medical monitoring service that is developed and offered by another vendor, e.g., it is only loosely coupled with its other integrated services. A blockchain implementation allows the operator and the connected home or medical service provider to build a common understanding of all the relevant events in the home without the risk of unauthorized modification by either party (immutability property and consensus algorithms). For example, if data from a wearable device, typically transmitted to another device via Bluetooth or another short-range wireless protocol, is determined as not being received when it is expected, it may be useful for a connectivity service (e.g., associated with router 108) to signal that to connected health service, e.g., via the historical ledger.

In some embodiments, in the distributed ledger implementation of database 134, each participant or member of the community may have access to the distributed ledger 201 and may store a local copy of distributed ledger 201. The local copies may be updated via continuous or peer-to-peer communications between the community members, and the integrity of the blockchain may be verified by examining blocks of distributed ledger that are linked by a sequence of hashes. In some embodiments, such verification may confirm attributes of blocks based on a proof of work (e.g., an indication that a user expended effort by way of consuming the content, such as, for example, an indication from the content provider that substantially all of the content was played back at the user device). The hash may be calculated by applying a hash function or hash algorithm (e.g., Secure Hash Algorithms, such as, for example, SHA-1, SHA-2, SHA-256) to all of the data associated with the block, where such computed hashes are deterministic and impractical to reverse. In some embodiments, the new block may be verified by consensus of the community (e.g., by checking the correctness of a hash chain of the distributed ledger). The chaining of hashes ensures that the blockchain cannot be modified by any entity, as other entities will be able to recompute hashes and verify that all hashes in the blockchain are correct. For example, if any payload is tampered with, a correct hash would not be computed based on the tempered payload, leading to the discovery of the tampering.

Figure 3:
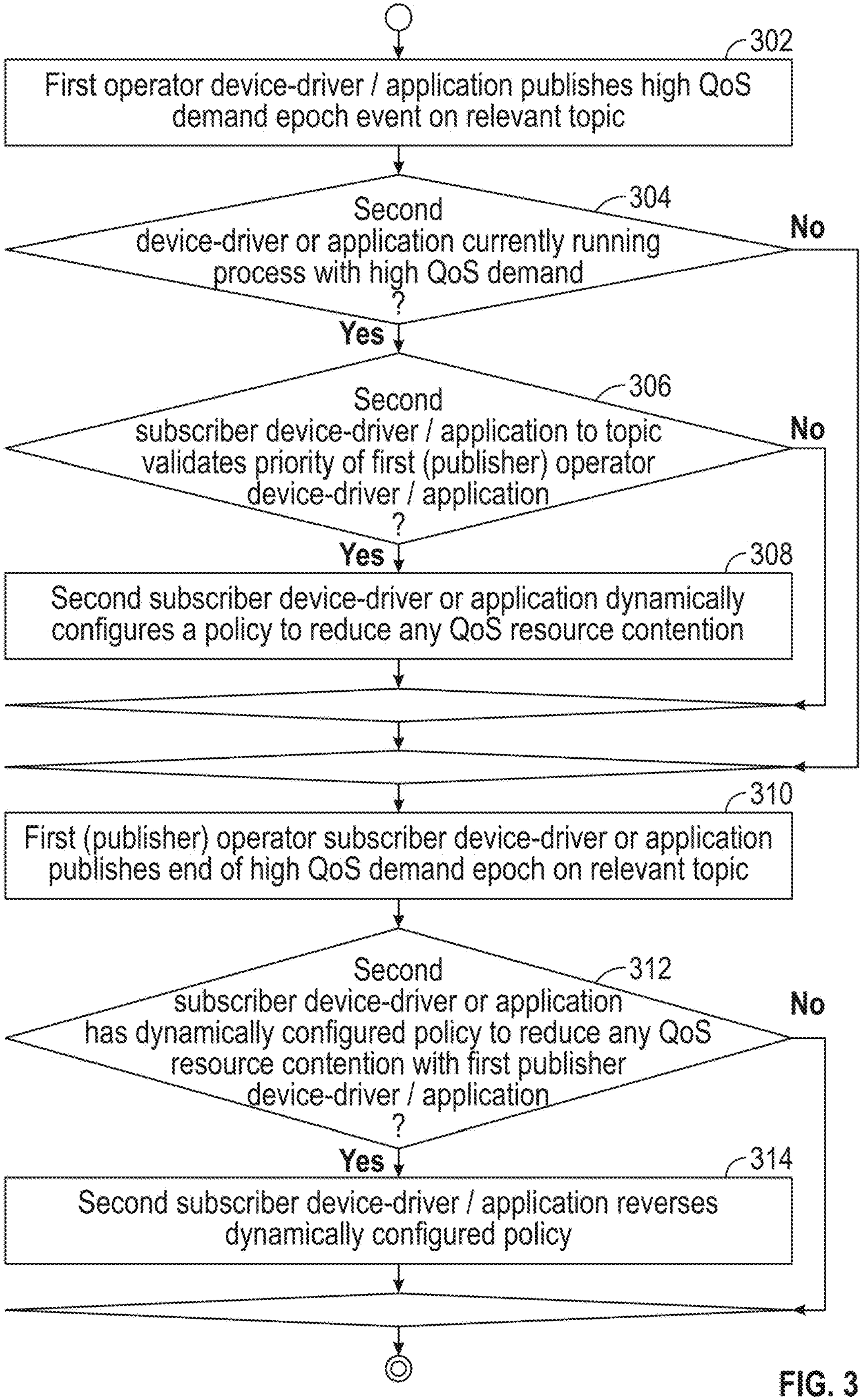
FIG. 3 is a flowchart of a detailed illustrative process for implementing dynamic policies as part of the publish-subscribe architecture, in accordance with some embodiments of this disclosure.

FIG. 3 is a flowchart of a detailed illustrative process for implementing dynamic policies as part of the publish-subscribe architecture, in accordance with some embodiments of this disclosure. In various embodiments, the individual steps of process 300 may be implemented by one or more components of the devices, methods, and systems of FIGS. 1A-1C and 2-9 and may be performed in combination with any of the other processes and aspects described herein. Although the present disclosure may describe certain steps of process 300 (and of other processes described herein) as being implemented by certain components of the devices, methods, and systems of FIGS. 1A-1C and 2-9, this is for purposes of illustration only, and it should be understood that other components of the devices, methods, and systems of FIGS. 1A-1C and 2-9 may implement those steps instead.

As shown in FIG. 3, system 100 may implement dynamic policies as part of the publish-subscribe architecture, to provide for multi-service QoE optimization. As an illustrative example, at 302, system 100 detects that a task demanding high bandwidth is currently being performed (e.g., a video game download to a device in location 104 is occurring). For example, the gaming console is an operator device, and the application on the gaming console may publish this event directly as a game download on a suitable channel provided by the publish-subscribe architecture 130 such as, for example, "LAN." Alternately, the Wi-Fi router 108 may make this determination based on monitoring a bandwidth usage, source IP and/or traffic pattern in relation to the gaming console. The gaming console may publish this event on the channel, and since game downloads may be identified as time-sensitive as they are typically followed by game play, devices subscribing to the channel that describes LAN connectivity bandwidth, such as a video STB or Connected Home Hub, may take action to reduce their impending downstream bandwidth needs in favor of the game download.

For example, at 304, system 100 may determine whether a second device-driver is currently running a process with a high QoS demand, e.g., based on an amount of bandwidth being consumed by the second device-driver. If yes, processing proceeds to 306; otherwise, processing proceeds to 310. At 308, upon determining at 306 that the topic on which the first device-driver published at 302 validates priority of the first publisher and the operator device-driver/application, system 100 may, at 308, dynamically configure a policy to reduce an QoS resource contention for the second subscriber device-driver. For example, a STB or connected home device may be scheduled for a firmware update that is intentionally delayed by the device. In another example, the Wi-Fi router may detect a strain on upstream bandwidth from personal computing devices (e.g., due to video calls). It may publish this event on a suitable Channel. A connected home camera, as a Topic subscriber, may delay a video upload based on this event.

In yet another example, when an MVNO mobile device running applications with high QoS demand joins the home Wi-Fi network at location 104 (e.g., transitions from providing a service over a cellular data network to via a home Wi-Fi network), the event may be published on the topic pertaining to QoS needs on the Wi-Fi network. In order to ensure that the device is able to smoothly offload traffic from the mobile network to the Wi-Fi network (connected to the wired broadband network owned by the operator), other operator devices subscribed to the Topic may back off their QoS needs from the Wi-Fi network. Specifically, an operator video application currently receiving 4K video may reduce its Wireless Multimedia (WMM) priority from "Video" to "Best Effort" so that another high bandwidth video application on the MVNO mobile device can run smoothly upon transitioning to the Wi-Fi network, as described in the 802.11e specification for providing QoS enhancements over Wi-Fi.

At 310, which may be performed based on a negative determination at 304 or 306, or after performance of 308, the first (publisher) operator device-driver (e.g., the gaming console described above) may publish the end of the high QoS demand epoch (e.g., download of a video game) on the relevant topic. At 312, upon determining that the second subscriber device-driver or application (e.g., the STB having delayed its firmware update) has dynamically configured policy to reduce any QoS resource contention with first publish device-driver/application, the second subscriber device-driver or application may reverse its dynamically configured policy, e.g., being downloading the firmware update at the STB.

Figure 4:
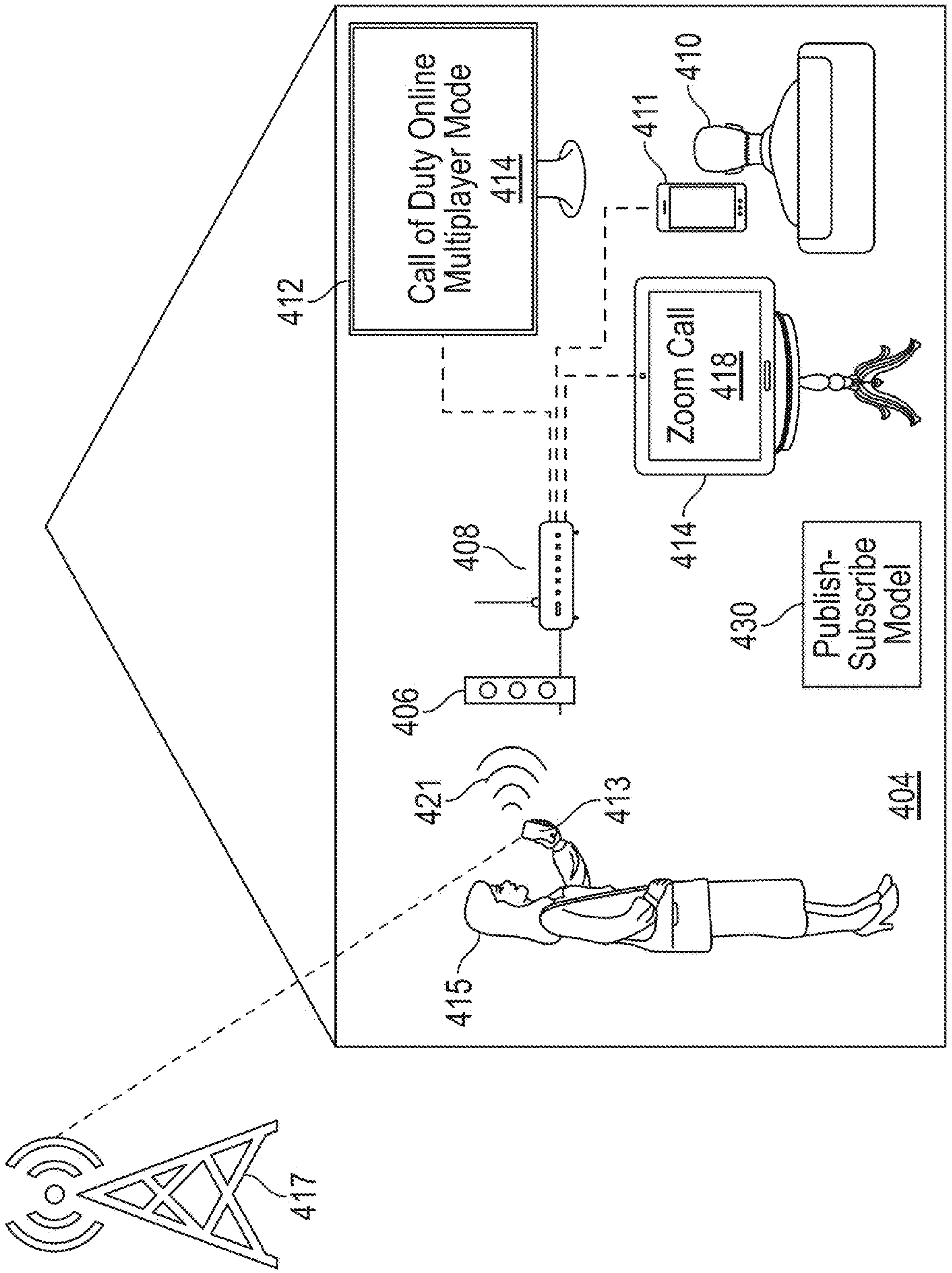
FIG. 4 shows an illustrative system for providing a service in an LAN based on a mobile hotspot in the event of a broadband outage, in accordance with some embodiments of this disclosure.

FIG. 4 shows an illustrative system for providing a service in an LAN based on a mobile hotspot in the event of an outage, in accordance with some embodiments of this disclosure. System 400 may comprise network equipment 406 and 408 (e.g., modem, router and/or gateway, which may correspond to network equipment 106 and 108 of FIG. 1A), which may be providing an LAN within location 404 (which may correspond to location 104 of FIG. 1A), linking the LAN devices of location 104 to a first WAN, such as, for example, the public Internet (e.g., provided via a wired network infrastructure of an ISP, such as shown at service provider network 102 of FIG. 1A). One of more servers (e.g., server 124 of FIG. 1A) may be configured to transmit data via the WAN to the LAN at location 404, e.g., data intended for device 412 and 414 may be received at modem 406, and subsequently broadcast via router 408, to enable device 412 to provide a service, e.g., provide an online video game to user 410, and/or to enable device 414 to participate in a zoom call.

System 400 may detect an outage in relation to the first WAN, where such outage may prevent devices, such as, for example, device 412 and device 414, from continuing to provide the services that were being provided prior to the detected outage, based on data transmitted by the server (e.g., server 124 of FIG. 1A) to the LAN via the first WAN. System 400 may reconfigure the network in location 404 based on detecting the service interruption of a broadband outage. For example, system 400 may be aware of mobile devices 411 and 413 (e.g., smartphones of users 410 and 415, respectively) having previously been configured to communicate with router 408 in the LAN, and system 400 may leverage a mobile hotspot wireless network 421 (e.g., provided by a cellular network connection to cell tower infrastructure 417 of mobile devices 411 or 413). For example, mobile device 413 may be selected based on having a better signal strength (as determined using Received Signal Strength Indicator, or RSSI) to router 408 than mobile device 411, and/or better bandwidth in downstream and upstream directions (e.g., as determined by running a speed test), and/or a lower latency, and system 400 may cause mobile device 413 to activate a mobile hotspot 421 based on its cellular network, when the outage is detected. A bridge communication link may be established between mobile device 413 and router 408, a device in the LAN (e.g., device 412) to receive, via router 408, data transmitted over a second WAN (e.g., a cellular data network facilitated by mobile hotspot 421). For example, router 408 may relay data received from the second WAN to devices in the LAN, and may relay data received from devices in the LAN to the second WAN, e.g., upstream to the server 124 of FIG. 1A, during the outage. In some embodiments, such bridge communication link may enable devices 412 and 414 to resume connectivity with the server (e.g., server 124 of FIG. 1A) via networking equipment 408 and mobile hotspot 421 without a user having to enter new credentials for the network for every device currently connected to the wireless LAN.

System 400 may automatically set up a mobile hotspot 421 in the home in response to a wired broadband outage, to allow near-seamless connectivity to all the devices in the home by setting up a bridge communication link directly between a mobile device and the Wi-Fi router, to provide in-home Wi-Fi during wired broadband outage.

However, many MVNOs pay a variable (tiered) amount to mobile network operators based on the amount of mobile data consumed by their customers during a billing period. If all devices within the home continue to operate without interruption during the outage using the wireless second WAN facilitated by the mobile hotspot 421, then a significant amount of mobile data may be consumed during the outage, driving up costs for the wired broadband MVNO operator and/or the subscriber. To address this issue, system 400 may provide multi-service QoE optimization using publish-subscribe architecture model 430 (corresponding to publish-subscribe model 130 of FIG. 1. For example, in some embodiments, cable modem 406 (or any other suitable device in the LAN or external to the LAN) may cause a DOCSIS broadband outage event to be published on the "WAN" channel/topic. Subsequently, mobile device 413 with hotspot capability that has verified its vicinity with the Wi-Fi Router (e.g., using RSSI, received signal strength indicator) advertises its ability to provide the second WAN connectivity.

In some embodiments, such mobile device 413 device sets up the second WAN connectivity using a bridge link with the Wi-Fi router. Then, even though the various operator device driver modules or applications subscribing to this channel in location 404 expect to remain connected using the mobile network, they can take individual actions to reduce throughput (e.g., mobile data consumption). For example, while accessing (e.g., transmitting data to or receiving data from) the second WAN (e.g., by way of the bridge communication link with router 408) during the detected outage, video applications on STBs or otherwise (e.g., Zoom call 418, or the Call of Duty video game shown at 414) may apply an upper limit on throughput (hence on video resolution) determined by the adaptive bitrate streaming (ABR) ladder. In some embodiments, a cloud gaming console or cloud XR HMD may apply a similar constraint and may even reduce the frame rate to reduce throughput. A connected home hub (or cloud server application subscribed to the channel) may reduce resolution of the video being uploaded (e.g., continuous cloud video recording, or motion event-driven cloud video recording). Similarly, the Wi-Fi router 408, providing miscellaneous connectivity to a host of devices by leveraging the mobile hotspot 421, may reduce its upper control limit of bandwidth, increasing contention for bandwidth among the connected devices.

In some embodiments, an operator may dynamically adjust connectivity during a wired broadband outage to cause its own services to take priority over miscellaneous broadband access by (non-operator) devices connected to the Wi-Fi router. A mobile device (or other device) capable of providing a mobile hotspot 421, upon learning of wired broadband outage as a subscriber to the "WAN" topic, may automatically configure a service set identifier (SSID) with entry credentials that are different from the Wi-Fi router SSID. Such mobile device (or other device) may then publish these entry credentials to an access-controlled group of devices using an access-controlled topic. For example, the operator-provided STBs may be subscribed to this topic and learn of the new SSID. They may reconfigure themselves to join the new SSID and avail of higher bandwidth allocation or WLAN prioritization, while the miscellaneous Wi-Fi connected non-service provider devices may be throttled due to lower priority/bandwidth-limited treatment to the bridge link with the Wi-Fi router (e.g., remain connected to the same SSID to which they were connected prior to the outage). This allows the operator to create a tiered system for policy implementation during outages, wherein some devices may be subject to greater contention for the WAN bandwidth than others.

Figure 5:
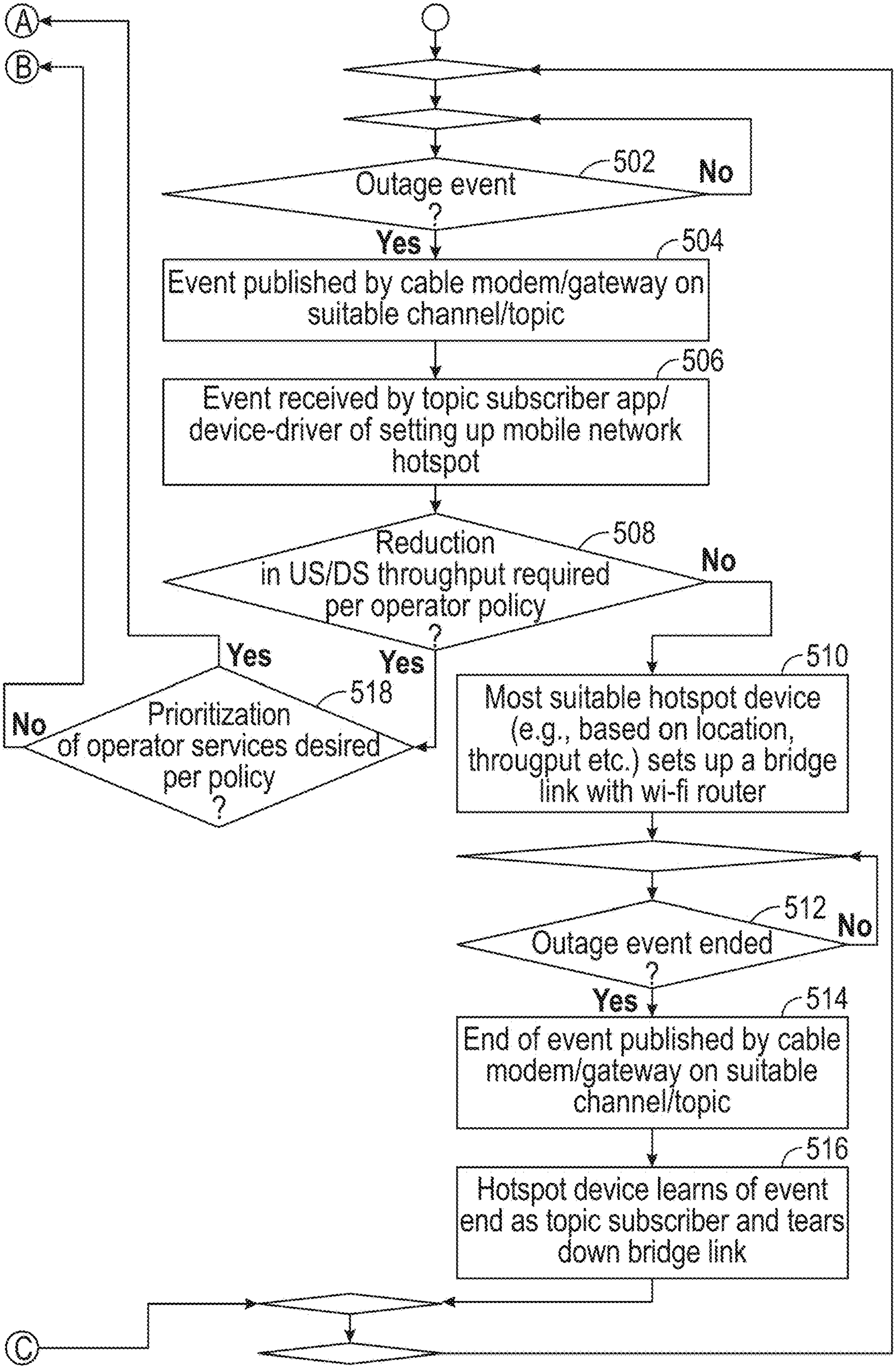
FIG. 5 shows an illustrative system for providing a service in an LAN based on a mobile hotspot in the event of a broadband outage, in accordance with some embodiments of this disclosure.
Figure 5:
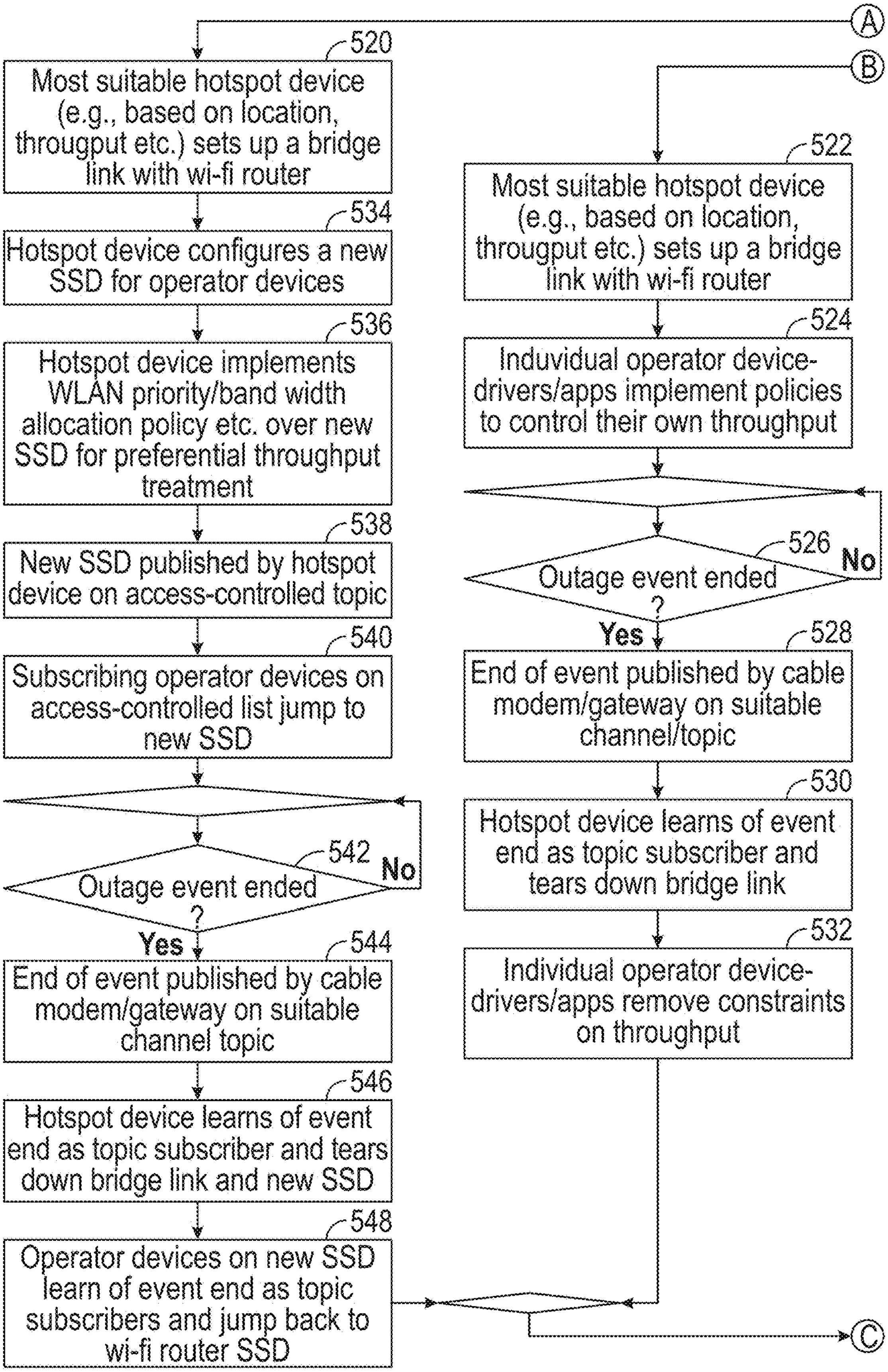

FIG. 5 shows an illustrative flowchart for providing a service in an LAN based on a mobile hotspot in the event of a broadband outage, in accordance with some embodiments of this disclosure. In various embodiments, the individual steps of process 500 may be implemented by one or more components of the devices, methods, and systems of FIGS. 1A-1C and 2-9 and may be performed in combination with any of the other processes and aspects described herein. Although the present disclosure may describe certain steps of process 500 (and of other processes described herein) as being implemented by certain components of the devices, methods, and systems of FIGS. 1A-1C and 2-9, this is for purposes of illustration only, and it should be understood that other components of the devices, methods, and systems of FIGS. 1A-1C and 2-9 may implement those steps instead.

At 502, system 400 may determine an outage event, e.g., no Internet signal at modem 406 of location 404. At 504, cable modem 406, router 408 and/or a gateway may publish an event indicating the outage event on a suitable channel/topic of publish-subscribe model 430. At 506, the published event is received by an application and/or device that is a topic subscriber to such channel and that is capable of setting up a mobile network hotspot. At 508, system 400 may determine whether a reduction in upstream/downstream throughput is required as per operator policy with respect to the mobile network hotspot. If so, processing my proceed to 512; otherwise, processing may proceed to 518. At 510, having failed to identify an operator policy with respect to throughput, a most suitable hotspot device (e.g., based on location and/or throughput capability and/or latency) may be identified, to be used to set up a bridge communication link with Wi-Fi router 408, as discussed in relation to FIG. 4. At 512, upon determining the outage has ended (e.g., an Internet signal is detected again at modem 406 from the WAN), system 400 may, at 514, publish the end of the outage event by way of cable modem 106, router 108 and/or a gateway. At 516, the hotspot device (e.g., mobile device 413) may be notified of the end of the outage via publish-subscribe model 430, and may disable its hotspot network, to tear down the bridge link.

At 518, based at least in part on the affirmative determination at 508, system 400 may determine whether the policy indicated at 508 indicates a prioritization of operator services over other services. If yes, processing may proceed to 520; otherwise processing may proceed to 522. 520 and 522 may be implemented in a similar manner as 510. After 522, system 400 may, at 524, cause individual operator device-drivers/applications to implement policies to control their own throughput, e.g., as discussed in FIG. 4, a STB may delay download of a firmware update, based on receiving a message via the publish-subscribe model 430 that another device, e.g., a gaming console, is performing a more time-sensitive tasks, e.g., downloading a video game. At 528, having determined that the outage has ended at 526, networking equipment 406 and/or 408 may publish, using publish-subscribe model 430, a message indicating an end of the outage event. 530 may be implemented in a similar manner as 516, and at 532, system 400 may cause the individual operator device-driver/applications to remove the constraints on throughput, e.g., since the cellular network data caps or data limits are not a concern with broadband Internet from the ISP back up and running.

At 534, based at least in part on determining that an operator has prioritized services as per an operator policy, system 400 may configure a new SSID for operator devices (e.g., a STB provided by a same entity as modem 106 and/or router 108). For example, mobile device 413 of FIG. 4 may configure a new SSD for operator devices, and at 536, mobile device 413 may implement a WLAN priority/bandwidth allocation policy using the new SSID, for preferential network treatment for the operator's devices. At 538, system 400 may enable mobile device 413 to publish the new SSID on an access-controlled topic, and at 540, subscriber operator devices on the access-controlled list jump to a new SSID. At 542, having determined that the outage event has ended, system 400 may, at 544, publish an end of the outage event by way of networking equipment 406 and/or 408. At 546, the hotspot device (e.g., mobile device 413) may be notified of the end of the outage via publish-subscribe model 430, and may disable its hotspot network, to tear down the bridge link, and at 548, operator devices on the new SSID may be notified of the end of the outage via publish-subscribe model 430, and may jump back to the Wi-Fi router SSID, to resume network connectivity by way of the broadband Internet provided to location 104 via network equipment 406 and/or 408.

Figure 6:
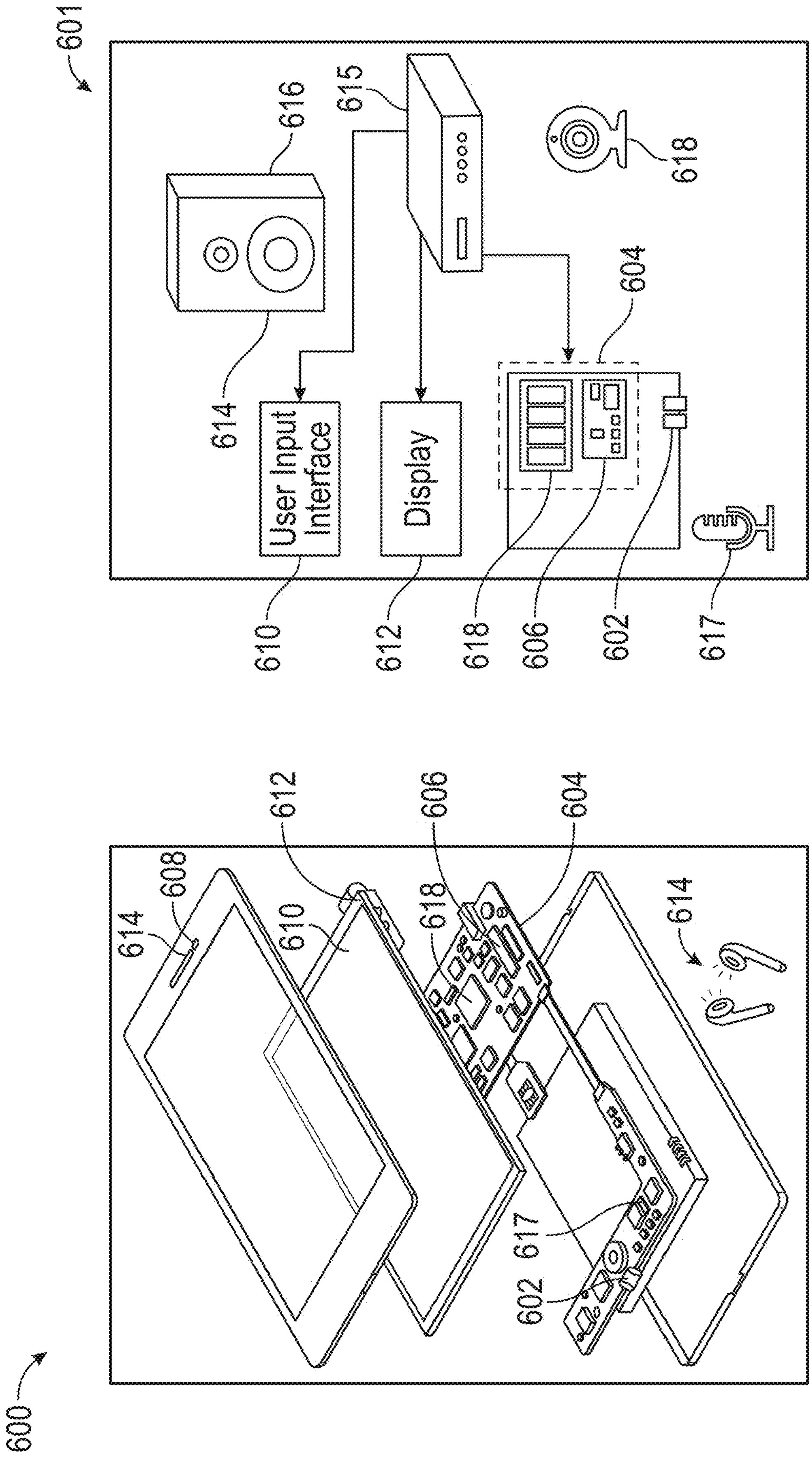
FIGS. 6-7 show illustrative devices, systems, servers, and related hardware for providing a publish-subscribe model in an LAN, in accordance with some embodiments of this disclosure.
Figure 7:
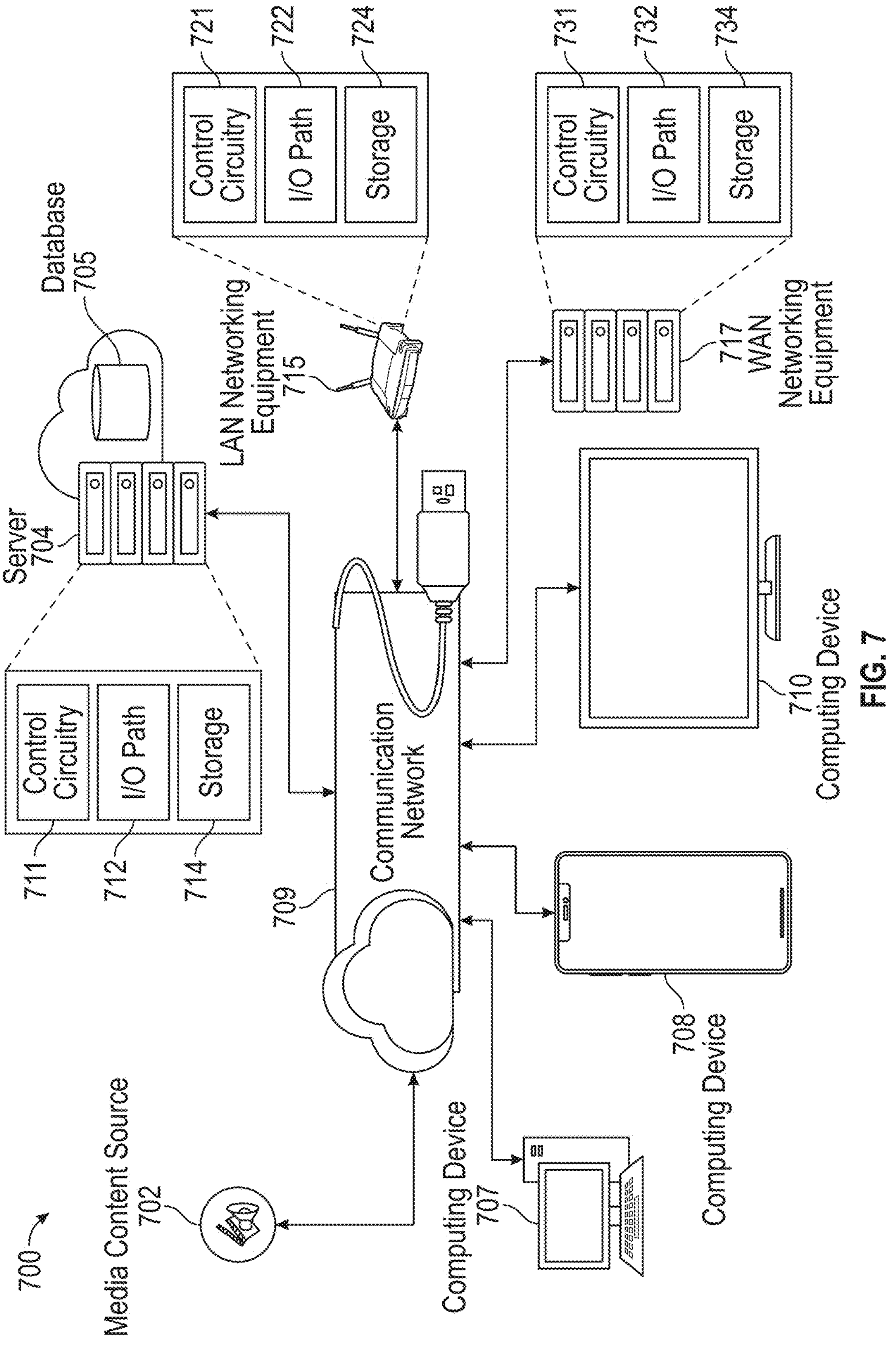

FIGS. 6-7 show illustrative devices, systems, servers, and related hardware for for providing a publish-subscribe model in an LAN, in accordance with some embodiments of this disclosure. FIG. 6 shows generalized embodiments of illustrative computing devices 600 and 601, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR HMD; a VR HMD; or any other suitable computing device; or any combination thereof. In another example, computing device 601 may be a user television equipment system or device. In some embodiments, computing devices 600 and 601 may correspond to, e.g., device 112 or device 114 of FIG. 1A, and devices 411, 412, 413, and 414 of FIG. 4.

User television equipment device 601 may include set-top box 615. Set-top box 615 may be communicatively connected to microphone 617, Audio output equipment (e.g., speaker or headphones 614), and display 612. In some embodiments, microphone 617 may receive audio corresponding to a voice of a user providing input. In some embodiments, display 612 may be a television display or a computer display. In some embodiments, set-top box 615 may be communicatively connected to user input interface 610. In some embodiments, user input interface 610 may be a remote control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 7. In some embodiments, computing device 600 may comprise any suitable number of sensors (e.g., gyroscope or accelerometer, etc.), and/or a GPS module (e.g., in communication with one or more servers and/or cell towers and/or satellites) to ascertain a location of computing device 600. In some embodiments, computing device 600 comprises a rechargeable battery that is configured to provide power to the components of the device.

Each one of computing device 600 and computing device 601 may receive content and data via input/output (I/O) path 602. I/O path 602 may provide content (e.g., broadcast programming, on-demand programming, Internet content, content available over an LAN and/or WAN, and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., computing device 600), an XR device; a tablet; a network-based server hosting a user-accessible client device; a non-user-owned device; any other suitable device; or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for the system or application stored in memory (e.g., storage 608). Specifically, control circuitry 604 may be instructed by the system or application to perform the functions discussed above and below. In some implementations, processing or actions performed by control circuitry 604 may be based on instructions received from the system or application.

In client/server-based embodiments, control circuitry 604 may include communications circuitry suitable for communicating with a server or other networks or servers. The system or application may be a stand-alone application implemented on a device or a server. The system or application may be implemented as software or a set of executable instructions. The instructions for performing any of the embodiments discussed herein of the system or application may be encoded on non-transitory computer-readable media (e.g., a hard drive, random-access memory on a DRAM integrated circuit, read-only memory on a BLU-RAY disk, etc.). For example, the instructions may be stored in storage 608, and executed by control circuitry 604 of a computing device 600.

In some embodiments, the system or application may be a client/server application where only the client application resides on device 600 (e.g., device 112 or 114 of FIG. 1A), and a server application resides on an external server (e.g., server 704 of FIG. 7). For example, the system or application may be implemented partially as a client application on control circuitry 604 of device 600 and partially on server 704 as a server application running on control circuitry 711. Server 704 may be a part of a local area network with one or more of computing devices 600, 601 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 704 and/or an edge computing device), referred to as "the cloud." Device 600 may be a cloud client that relies on the cloud computing capabilities from server 704 to determine whether processing (e.g., at least a portion of virtual background processing and/or at least a portion of other processing tasks) should be offloaded from the mobile device, and facilitate such offloading. When executed by control circuitry of server 704, the system or application may instruct control circuitry 711 to perform processing tasks for the client device and facilitate applying preferential treatment on the WAN to certain network traffic corresponding to data requested by a device on an LAN. The client application may instruct control circuitry 604 to determine where processing should be performed.

Control circuitry 604 may include communications circuitry suitable for communicating with a server, edge computing systems and devices, a table or database server, or other networks or servers The instructions for carrying out the above mentioned functionality may be stored on a server (which is described in more detail in connection with FIG. 7. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 7). In addition, communications circuitry may include circuitry that enables peer-to-peer communication of computing devices, or communication of computing devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as the system or application data described above. Nonvolatile memory may also be used (e.g., to launch a boot-up routine and other instructions). Cloud-based storage, described in more detail in relation to FIG. 7, may be used to supplement storage 608 or instead of storage 608.

Control circuitry 604 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 604 may also include scaler circuitry for upconverting and down converting content into the preferred output format of computing device 600. Control circuitry 604 may also include digital-to-analog converter circuitry and analog-to-digital converter circuitry for converting between digital and analog signals. The tuning and encoding circuitry may be used by computing device 600, 601 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from computing device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touchscreen, touchpad, stylus input, joystick, voice recognition interface, or other user input interfaces. Display 612 may be provided as a stand-alone device or integrated with other elements of each one of computing device 600 and computing device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of computing device 600 and computing device 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 617 or audio output equipment 614 may include a microphone configured to receive audio input such as voice commands or speech. For example, a user may speak letters, words, terms and/or numbers that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The system or application may be implemented using any suitable architecture. For example, it may be a stand-alone application wholly-implemented on each one of computing device 600 and computing device 601. In such an approach, instructions of the application may be stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to provide the functionality, and generate any of the displays, discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, historical interactions by the user, and/or any other suitable data. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the system or application is a client/server-based application. Data for use by a thick or thin client implemented on each one of computing device 600 and computing device 601 may be retrieved on-demand by issuing requests to a server remote to each one of computing device 600 and computing device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on computing device 600. This way, the processing of the instructions is performed remotely by the server while the resulting displays (e.g., that may include text, a keyboard, or other visuals) are provided locally on computing device 600. Computing device 600 may receive inputs from the user via input interface 310 and transmit those inputs to the remote server for processing and generating the corresponding displays. For example, computing device 600 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 600 for presentation to the user.

In some embodiments, the system or application may be downloaded and interpreted or otherwise run by an interpreter or virtual machine (run by control circuitry 604). In some embodiments, system or application may be encoded in the ETV Binary Interchange Format (EBIF), received by control circuitry 604 as part of a suitable feed, and interpreted by a user agent running on control circuitry 604. For example, the system or application may be an EBIF application. In some embodiments, the system or application may be defined by a series of JAVA-based files that are received and run by a local virtual machine or other suitable middleware executed by control circuitry 604. In some of such embodiments (e.g., those employing MPEG-2, MPEG-4, HEVC or any other suitable digital media encoding schemes), the system or application may be, for example, encoded and transmitted in an MPEG-2 object carousel with the MPEG audio and video packets of a program.

FIG. 7 is a diagram of an illustrative system 700 for providing a publish-subscribe model in an LAN, in accordance with some embodiments of this disclosure. Computing devices 705, 707, 708, 710 (which may correspond to, e.g., computing device 112 or device 114 of FIG. 1A, and devices 411, 412, 413, and 414 of FIG. 4.) may be coupled to communication network 709. Communication network 709 may be one or more networks including the Internet, a mobile phone network, mobile voice or data network (e.g., a 5G, 4G, or LTE network), cable network, public switched telephone network, satellite network, or other types of communication network or combinations of communication networks. Paths (e.g., depicted as arrows connecting the respective devices to the communication network 709) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 15 to avoid overcomplicating the drawing. In some embodiments, communication network 709 may correspond to service provider network 102.

LAN networking equipment 715 may correspond to, for example, networking equipment 106 and/or 108 (e.g., router, gateway, switch, and/or modem and/or other suitable equipment) of FIG. 1A and networking equipment 406 and/or 408 of FIG. 4. LAN networking equipment 715 may comprise control circuitry 721, I/O path 722, and storage 724. WAN networking equipment 717 may correspond to, for example, networking equipment 1722 (e.g., a backbone or carrier router or CMTS other suitable networking equipment) of FIG. 1. WAN networking equipment 717 may comprise control circuitry 731, I/O path 732, and storage 734.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 709.

System 700 may comprise media content source 702, one or more servers 704, and/or one or more edge computing devices. In some embodiments, system or application may be executed at one or more of control circuitry 711 of server 704 (and/or control circuitry of computing devices 705, 707, 708, 710 and/or control circuitry of one or more edge computing devices). In some embodiments, media content source 702 and/or server 704 may be configured to facilitate network traffic between computing devices 705, 707, 708, 710 and/or any other suitable computing devices, and/or host or otherwise be in communication (e.g., over network 709) with one or more application services. In some embodiments, server 704 may perform actions to facilitate processing network traffic based on received user input as described herein.

In some embodiments, server 704 may include control circuitry 711 and storage 714 (e.g., RAM, ROM, Hard Disk, Removable Disk, etc.). Storage 714 may store one or more databases. Server 704 may also include an input/output path 712. I/O path 712 may provide network traffic information, user preferences, device information, or other data, over an LAN and/or WAN, and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically control circuitry) to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 711 executes instructions for an emulation system application stored in memory (e.g., the storage 714). Memory may be an electronic storage device provided as storage 714 that is part of control circuitry 711.

Figure 8:
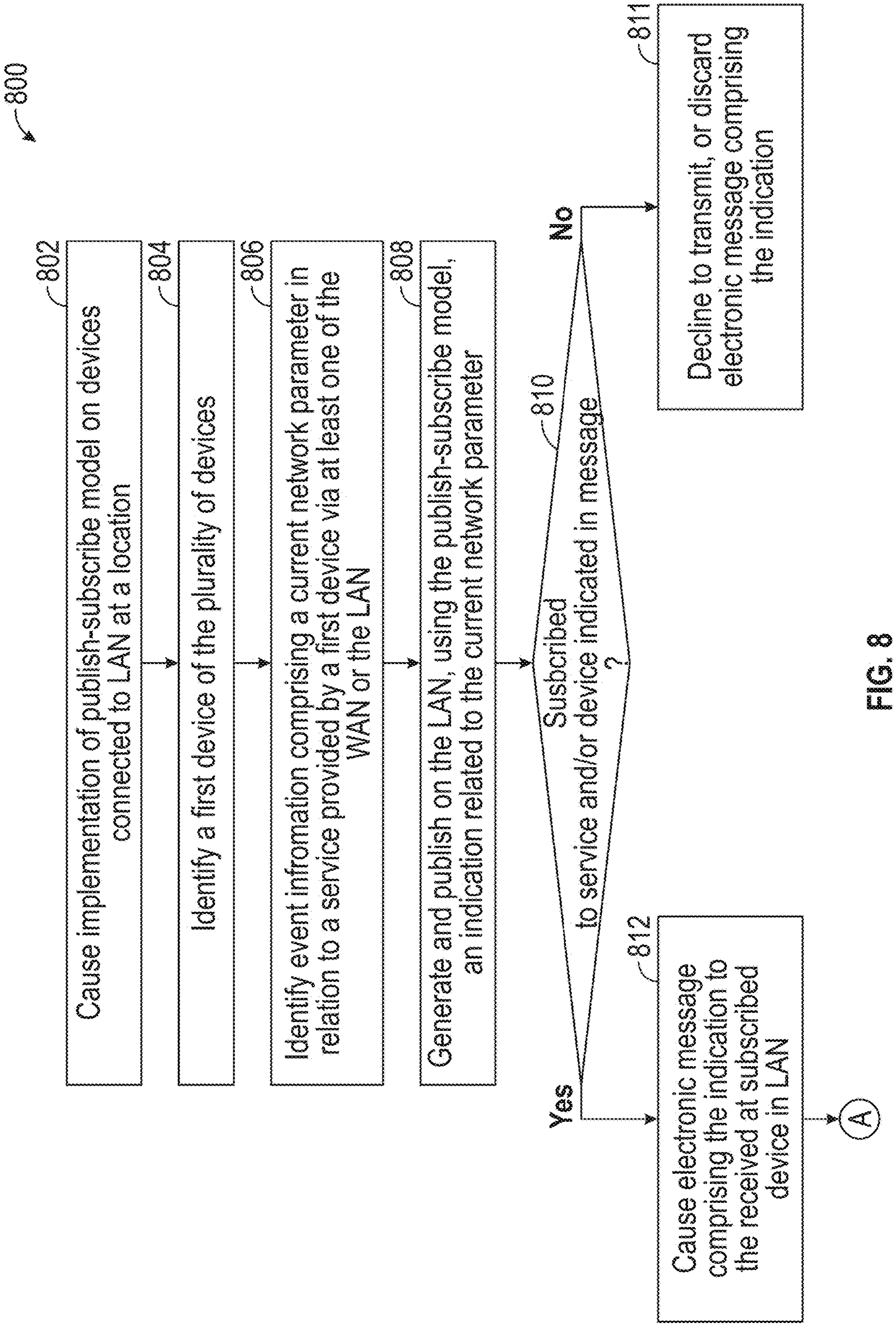
FIG. 8 is a flowchart of a detailed illustrative process for providing a publish-subscribe model in an LAN to perform actions based on published indications, in accordance with some embodiments of this disclosure.
Figure 8:
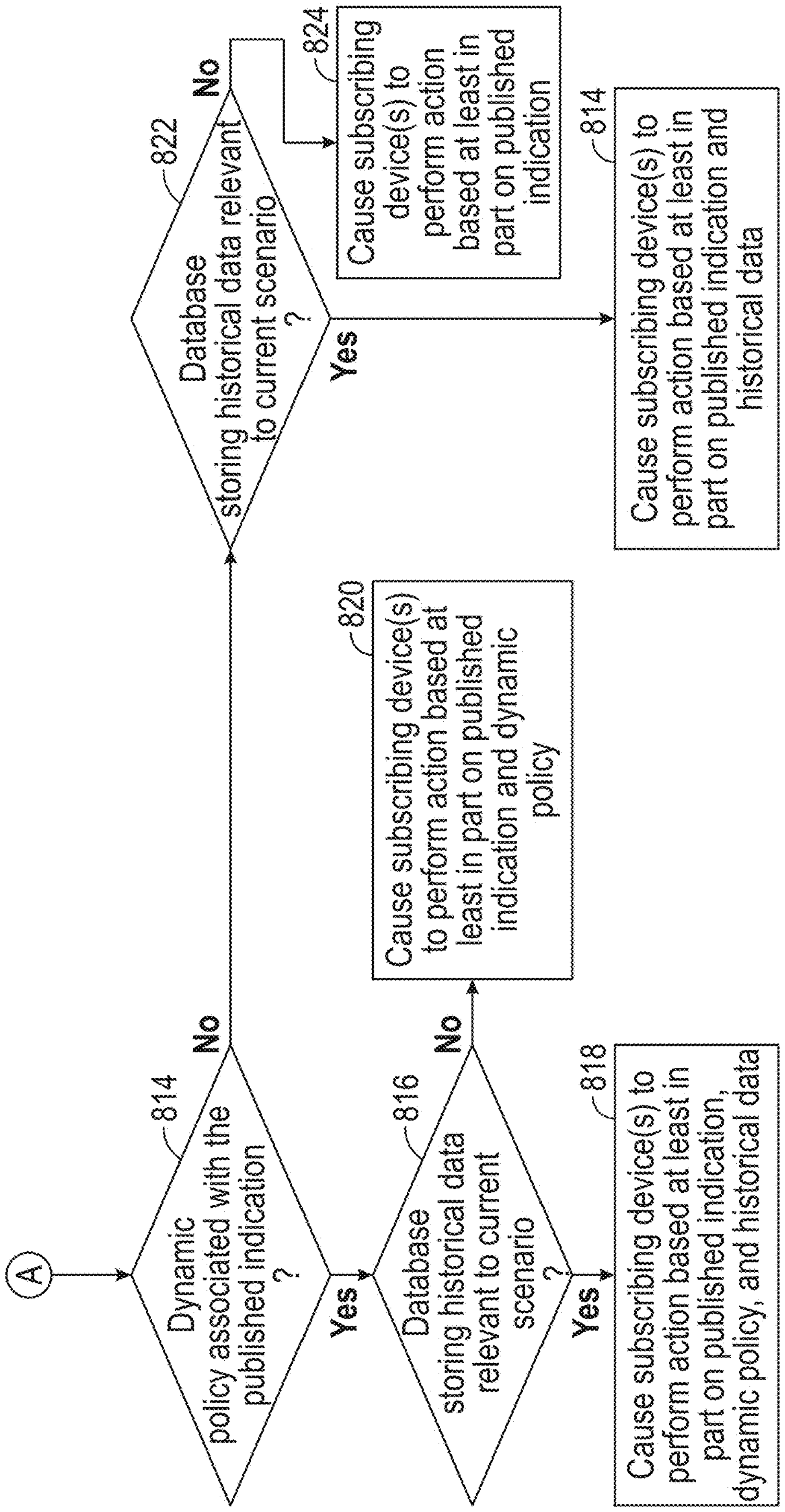

FIG. 8 is a flowchart of a detailed illustrative process 800 for providing a publish-subscribe model in an LAN to perform actions based on published indications, in accordance with some embodiments of this disclosure. In various embodiments, the individual steps of process 800 may be implemented by one or more components of the devices, methods, and systems of FIGS. 1-7 and 9 and may be performed in combination with any of the other processes and aspects described herein. Although the present disclosure may describe certain steps of process 800 (and of other processes described herein) as being implemented by certain components of the devices, methods, and systems of FIGS. 1-7 and 9, this is for purposes of illustration only, and it should be understood that other components of the devices, methods, and systems of FIGS. 1-7 and 9 may implement those steps instead.

At 802, control circuitry (e.g., control circuitry 604 of FIG. 6, and/or control circuitry 711, 721, and/or 731 of FIG. 7) may cause a publish-subscribe model to be implemented on a plurality of devices (e.g., devices 106, 108, 112, and/or 114 of FIG. 1A) in an LAN at a location (e.g., residence 104), where the LAN is connected to a WAN (e.g., the Internet). For example, the publish-subscribe model may be a software application that is installed, provided to, or is otherwise made accessible to the devices in the LAN. The publish-subscribe model enables a device to publish a message comprising event information (e.g., related to a current status of the network, related to network errors, or related to a service being provided or about to be provided by or to a device, or otherwise related to any suitable characteristic or aspect of the LAN and/or WAN). One or more devices on the LAN subscribed to messages published by the device, and/or messages published by a particular service, may receive the message and adjust their behavior with respect to the LAN and/or WAN accordingly. In some embodiments, the publish-subscribe model is implemented at a device in the WAN (e.g., a cloud controller for a Wi-Fi router) even though it pertains to the devices on the LAN. In such an example, devices may publish and subscribe to channels/ topics with the Wi-Fi router acting as a proxy device for the cloud message broker.

At 804, the control circuitry may identify a first device (e.g., one of devices 106, 108, 112, or 114 of FIG. 1A). For example, a router 108 or modem 106 in location 104 may maintain a table of device identifiers for devices on the LAN.

At 806, the control circuitry may identify event information comprising a current network parameter in relation to a service (e.g., one or more of the services shown in FIG. 1B) provided by a first device via at least one of the WAN or the LAN. For example, control circuitry 721 of networking equipment 715 (e.g., which may correspond to modem 106 and/or router 108 of FIG. 1A) may determine, as shown in FIGS. 2(*a*) and 2(*c*), a service interruption, e.g., that there is no Internet signal to a router or a model in location 104. As another example, a device (e.g., device 112) may determine that a Wi-Fi signal being received at device 112 is poor (or the router may publish an indication of the Wi-Fi signal) as shown in FIG. 2(*b*). As another example, as shown in FIG. 2(*a*) a device (e.g., device 112 and/or the video application being executed at least in part on device 112) may determine, e.g., based on an received indication (e.g., from cloud server 124, which may be associated with an entity providing the LAN), that there is a billing issue with a user's ISP, cable, streaming or other account.

At 808, the control circuitry may generate and publish on the LAN, using the publish-subscribe model, an indication related to the current network parameter. For example, networking equipment 715 (e.g., which may correspond to modem 106 and/or router 108 of FIG. 1A) of FIG. 7 may publish in relation to a service (e.g., broadcast to all devices, or only to devices subscribed to the service or subscribed to networking equipment 715). As another example, a device (e.g., device 112 or device 114 of FIG. 1A) may report its wireless LAN signal strength (which may be queried or self-reported periodically) to/from a wireless router on the "Wireless LAN" Topic, as shown at 132 of FIG. 1A, such as, for example, if its wireless LAN signal strength falls below a threshold or returns to above the threshold.

At 810, the control circuitry (e.g., of each respective device in the LAN implementing the publish-subscribe model, and/or of a central device, such as, for example, networking equipment 715 of FIG. 7) may determine whether the respective device is subscribed to the service indicated in the message and/or the device that transmitted the message. If so, processing may proceed to 812; otherwise, processing may proceed to 811, where the publishing device may decline to transmit an electronic message comprising the indication to each device that is not subscribed, or the devices that are not subscribed may ignore or discard the electronic message.

At 812, the control circuitry may cause the published indication to be received at the subscribing device, e.g., via the LAN or via any other suitable network. At 814, the control circuitry may determine whether a dynamic policy is associated with the published indication. For example, the published indication may include a flag notifying the receiving device that the indication is related to a time-sensitive task, e.g., a video game download, that should be allocated more downstream bandwidth than the task being performed by the receiving device (e.g., a STB with a scheduled firmware update). Upon determining that a dynamic policy is associated with the published indication, processing may proceed to 816; otherwise processing may proceed to 822.

At 816, the control circuitry may determine whether a database (e.g., database 134 of FIG. 1A) stores historical data that is related to the service or device indicated by the published indication, and/or a service or device related to a subscribing device receiving the published indication. For example, if a video service application is experiencing a drop in downstream bandwidth, historical data for the video streaming application may indicate that such drop in downstream bandwidth typically occurs during peak hours, and thus whether a current time is during peak hours may impact a determination of whether there is an error associated with the WAN, LAN and/or video streaming application. Processing may proceed to 818 if the database stores data relevant to the published indication, or to 820 upon determining that the database does not store data relevant to the published indication. In some embodiments, database 816 may be a distributed ledger, e.g., a distributed blockchain ledger.

At 818, the control circuitry may cause subscribing device (s) and/or services to perform an action based at least in part on the published indication received at 812, the dynamic policy identified at 814, and historical data accessed at 816. For example, the aforementioned STB may delay its firmware update based on an indication (received from a video game console or its proxy) that the video game console is perform a time-sensitive task at the same time, and such determination may be further based on historical data indicating that a user is unlikely to use the STB at the current time regardless. 820 may be performed similarly, but without taking into account historical data.

At 822, the control circuitry may perform a similar determination as at 814. At 824, having determined there is no relevant historical data stored at the database for the current scenario, the control circuitry may cause the subscribing device to perform an action based at least in part on the published indication (e.g., to cause a video streaming application or STB to display one of the messages shown in FIG. 2(*a*)-2(*d*)). On the other hand, at 826, the control circuitry may cause subscribing device(s) to perform action based at least in part on published indication and the historical data. For example, if the historical data indicates that a user is likely to view content using the STB imminently based on a current time, the control circuitry may delay the download of the video game, to allow the STB firmware download to occur, so that the STB will be updated in time for the user to consume content. In some embodiments, multiple devices and/or services may be configured to perform actions based on the published event information, dynamic policies, and/or historical data.

In some embodiments, the published indication causes the service being provided by a first device (e.g., a video game download) to be treated preferentially as compared to the service being provided by a second device (e.g., a STB firmware update), based at least in part on a preference of a user associated with the location (e.g., a user profile indicating a preference for playing video games as opposed to accessing the STB, or a user profile indicating a user has previously specified that certain devices, e.g., running a particular video streaming service, should be treated preferentially on the network, or home security cameras should be treated preferentially). As another example, during a time-sensitive service being performed by a device, another device (e.g., a home security camera) may suppress upload of recorded footage.

Figure 9:
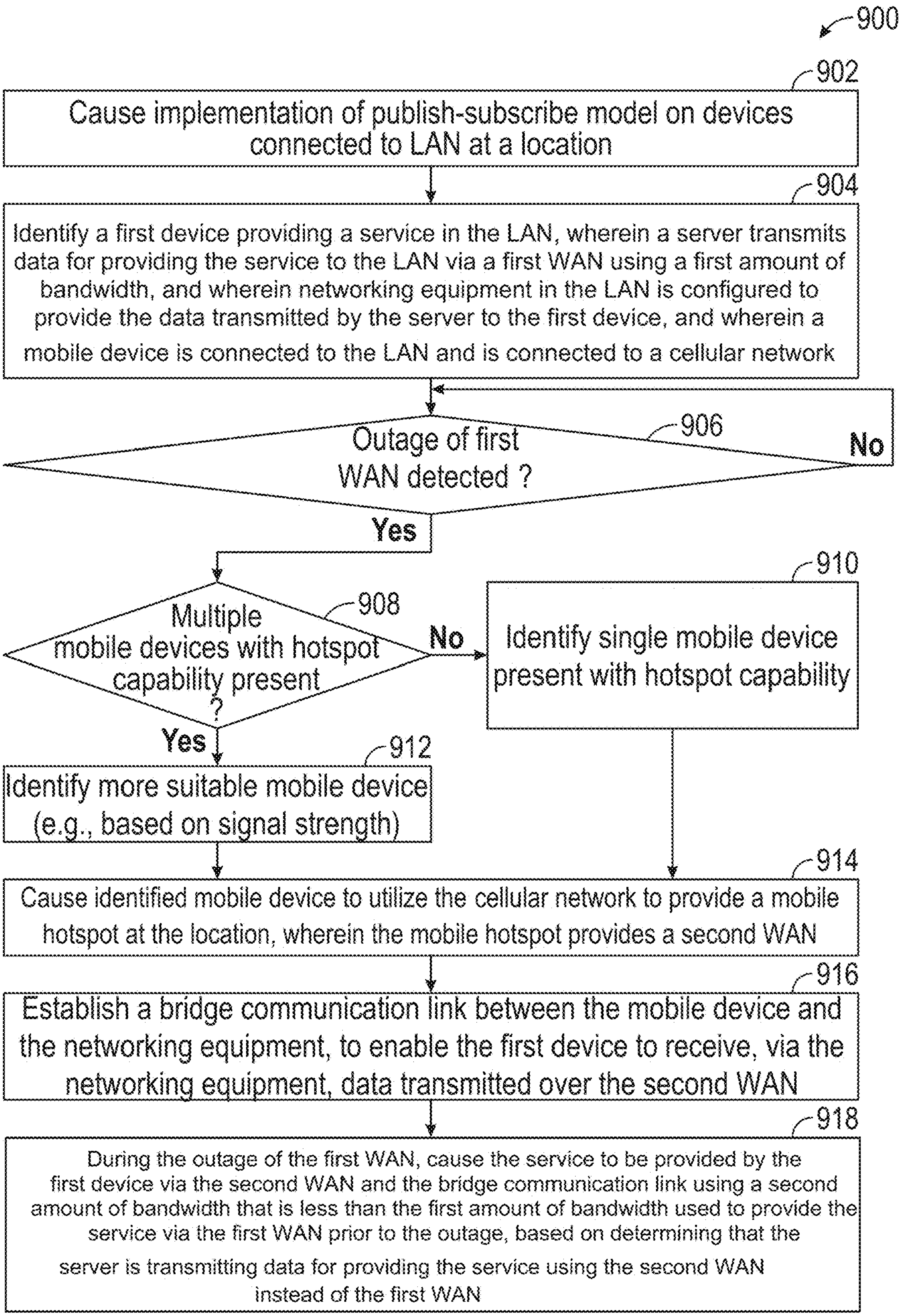
FIG. 9 shows an illustrative process providing a service in an LAN based on a mobile hotspot in the event of a broadband outage, in accordance with some embodiments of this disclosure.

FIG. 9 shows an illustrative process 900 for providing a service in an LAN based on a mobile hotspot in the event of a broadband outage, in accordance with some embodiments of this disclosure. In various embodiments, the individual steps of process 900 may be implemented by one or more components of the devices, methods, and systems of FIGS. 1-8 and may be performed in combination with any of the other processes and aspects described herein. Although the present disclosure may describe certain steps of process 800 (and of other processes described herein) as being implemented by certain components of the devices, methods, and systems of FIGS. 1-8, this is for purposes of illustration only, and it should be understood that other components of the devices, methods, and systems of FIGS. 1-8 may implement those steps instead.

At 902, control circuitry (e.g., control circuitry 604 of FIG. 6, and/or control circuitry 711, 721, and/or 731 of FIG. 7) may cause a publish-subscribe model to be implemented on a plurality of devices (e.g., devices 106, 108, 112, and/or 114 of FIG. 1A) in an LAN at a location (e.g., residence 104), where the LAN is connected to a WAN (e.g., the Internet). For example, the publish-subscribe model may be a software application that is installed, provided to, or is otherwise made accessible to the devices in the LAN. The publish-subscribe model enables a device to publish a message comprising event information (e.g., related to a current status of the network, related to network errors, or related to a service being provided or about to be provided by or to a device, or otherwise related to any suitable characteristic or aspect of the LAN and/or WAN). One or more devices on the LAN subscribed to messages published by the device, and/or messages published by a particular service, may receive the message and adjust their behavior with respect to the LAN and/or WAN accordingly. In some embodiments, the publish-subscribe model is implemented at a device in the WAN (e.g., a cloud controller for a Wi-Fi router) even though it pertains to the devices on the LAN. In such an example, devices may publish and subscribe to channels/topics with the Wi-Fi router acting as a proxy device for the cloud message broker.

At 904, the control circuitry may identify networking equipment (e.g., modem 406 and/or router 408 of FIG. 4), a mobile device (e.g., mobile device 411 and/or 413 of FIG. 4), and a first device (e.g., first device 412 or 414 of FIG. 4) connected to an LAN at a location, where the LAN transmits data to and receives data from a first WAN (e.g., provided by way of ISP infrastructure shown in FIG. 1A, such as service provider node 102), and where the mobile device is connected to a cellular network (e.g., 5G, 4G, or any other suitable cellular network, via cellular tower infrastructure 417 of FIG. 4). The control circuitry may cause the first device to provide a service (e.g., video streaming via a video streaming application) in the LAN, based on a server (e.g., server 124 of FIG. 1) transmitting data for providing the service via the first WAN to the LAN (e.g., received at modem 406 and transmitted to device 412 via router 408).

At 906, the control circuitry may determine whether an outage with respect to the first WAN has been detected. For example, the control circuitry may detect no Internet signal at modem 406 (at which signals from the first WAN signals enter location 404) and/or may detect no Internet signal to router 408. Processing may proceed to 908 if an outage is detected; if not, processing may remain at 906 (or the control circuitry may perform, e.g., process 800 of FIG. 8). In some embodiments, networking equipment 406 and/or 408 (e.g., running a DOCSIS service) of FIG. 4, and/or any other suitable device of the LAN (or external to the LAN) may employ the publish-subscribe model 430 to publish a broadband outage event (e.g., for the first WAN) on a suitable topic or channel to device(s) in the LAN.

At 908, the control circuitry may determine whether multiple mobile devices (e.g., mobile device 411 and/or 413 of FIG. 4) are present at the location (e.g., location 404 of FIG. 4). If so, the control circuitry may, at 912, identify the mobile device (e.g., mobile device 413) that is closer to the networking equipment 406 and/or 408 of FIG. 4 (e.g., based on the last signal strength detected prior to the outage and/or speed or latency indicated in the last speed test performed) and/or has a greater hotspot range or other hotspot capability than the other mobile device. Otherwise, at 910, the control circuitry may identify the single mobile device in the location having the hotspot capability. For example, the mobile device may have previously communicated its hotspot capability to networking equipment 406 and/or 408, using the publish-subscribe model (e.g., 430 of FIG. 4).

At 914, the control circuitry may identify the mobile device (e.g., mobile device 413) and cause the identified mobile device to utilize the cellular network to provide a mobile hotspot at the location. For example, the networking equipment (or other device on the LAN, which may be functional despite the outage in the first WAN) may set such actions in motion via a short-range communication with the mobile device, or a server (e.g., cloud server 124, which may be associated with an ISP, or networking equipment 122 associated with an ISP) may transmit a message to the mobile device to initiate the mobile hotspot network creation. The mobile hotspot may provide and facilitate access to a second WAN to the devices of the LAN.

At 916, the control circuitry may establish a bridge communication link between the mobile device (e.g., mobile device 413 of FIG. 4) and the networking equipment (e.g., router 408 of FIG. 4), to enable the first device to receive, via the networking equipment, data transmitted over the second WAN (e.g., data transmitted by server 124 of FIG. 1A, assuming server 124 is not impacted by the outage of the first WAN of the ISP). Devices on the LAN may be dynamically configured to be provided access to the second WAN (via networking equipment 408, which may route traffic to and from the mobile hotspot and the devices of the LAN), e.g., without a user in the premises having to configure devices with a new SSID, as the router (or other device in the LAN or external to the LAN) may publish the credentials to the devices at the premises, which may use such credentials to join the network. In some embodiments, the control circuitry may provide for the creation of a new network SSID such that separate policy considerations may be applied to devices admitted to the new network SSID, as opposed to other home devices that continue to be connected to the original home SSID with a WAN path via the bridge communication link.

The establishing of the bridge communication link may be understood as patching a new WAN connection. In some embodiments, the LAN continues to operate in the same or similar manner (via Wi-Fi router 408) after the outage of the first WAN is detected as before the outage of the first WAN is detected at 906, except there is a bridge link to patch in a new, second WAN. When the first WAN suffers an outage, the control circuitry may activate the mobile hotspot capability to activate a second WAN.

At 918, the control circuitry may, during the outage of the first WAN, cause the service (e.g., video streaming, or a video game, or a video conference) to be provided by the first device (e.g., device 412 or 414 of FIG. 4) via the second WAN (e.g., provided based on the mobile hotspot 421 of FIG. 4) using a second amount of bandwidth that is less than the first amount of bandwidth used to provide the service via the first WAN (e.g., the ISP network) prior to the outage. The control circuitry may cause this to occur based on determining that the server is transmitting data for providing the service using the second WAN instead of the first WAN. For example, many cellular data plans have data caps or limits, and thus it may be desirable to decrease data usage while the first WAN (e.g., provided by the ISP, and which may have robust data allowances than the cellular network), while devices are providing and/or receiving services and/or data by way of the second WAN (e.g., via the networking equipment 408 of FIG. 4 based on the bridge communication link) the second wireless location facilitated by the mobile hotspot. For example, a video streaming service may be caused to provide video at a lower bitrate and/or resolution (e.g., below a threshold) as compared to immediately prior to the outage. In some embodiments, networking equipment (e.g., 715 of FIG. 7) may set a data cap (e.g., 50 Mbps maximum for all devices in the home combined) while the wireless network facilitated by the mobile hotspot is utilized. In some embodiments, the bandwidth savings from the first amount of bandwidth to the second amount of bandwidth may not be allocated to other devices or services in the LAN, or may be allocated to one or more other devices or services (e.g., indicated as a preferred device or service by the user, or by an ISP providing networking equipment 406 and/or 408 and/or one or more devices or services in the LAN).

In some embodiments, an operator may publish a new SSID for its own devices, e.g., if an ISP provides IPTV services, the ISP might treat network traffic preferentially for its IPTV service at location 404 as compared to non-operator services (e.g., only provide connectivity to services the ISP provides, or otherwise throttle non-operator services. For example, separate SSIDs may be selectively published for operator-affiliated services and devices as compared to non-operator-affiliated services and devices, where preferential treatment may be applied to the first group of operator-affiliated services and devices on that wireless network during the outage.

As another example, if a service being provided prior to the outage involves providing content recommendations, relatively less content recommendations may be provided after the outage, while operating in a bandwidth-constrained mode when connected to the wireless network facilitated by the mobile hotspot via the networking equipment in-premise. In some embodiments, upstream and/or downstream bandwidth limits may be enforced during the outage.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

What is claimed is:

1. A computer-implemented method, comprising:

identifying networking equipment connected to a local area network (LAN) at a location, wherein the LAN transmits data to and receives data from a wide area network (WAN), and wherein the networking equipment implements a publish-subscribe model in which event information related to at least one of the WAN or the LAN is published by a device of a plurality of devices implementing the publish-subscribe model and connected to the LAN and is received by at least one device of the plurality of devices that is subscribed to receive data related to the event information, and wherein the LAN is provided at least in part by the networking equipment;

identifying, by the networking equipment, event information comprising a current network parameter in relation to a service provided by the networking equipment via at least one of the WAN or the LAN; and generating and publishing, using the publish-subscribe model, an indication related to the current network parameter, wherein a second device of the plurality of devices implementing the publish-subscribe model receives the indication based on being subscribed to data published for the service being provided by the networking equipment, and the second device is caused to perform an action based at least in part on the indication, wherein the indication comprises at least one of:

an indication that a signal strength between the networking equipment and the second device is below a threshold;

an indication that an error is causing an interruption to a service provided by the second device via at least one of the WAN or the LAN; or at least one of a bandwidth or a latency associated with at least one of the LAN or the WAN.

2. The method of claim 1, wherein the indication comprises the indication of the error that is causing the interruption to the service provided by the second device via at least one of the WAN or the LAN, and the action comprises causing display of a description of the error.

3. The method of claim 1, wherein the action comprises reducing an amount of bandwidth being used to provide a service via the second device in the LAN.

4. The method of claim 3, wherein the indication related to the current network parameter further comprises an indication that the service being provided by the networking equipment is time-sensitive, and a portion of the bandwidth previously used by the second device prior to the reducing is allocated to the networking equipment.

5. The method of claim 3, wherein the service being provided by the networking equipment is treated preferentially as compared to the service being provided by the second device based at least in part on a preference of a user associated with the location.

6. A computer-implemented method comprising:

identifying a mobile device connected to a local area network (LAN) at a location, wherein the LAN transmits data to and receives data from a wide area network (WAN), and wherein the mobile device implements a publish-subscribe model in which event information related to at least one of the WAN or the LAN is published by a device of a plurality of devices implementing the publish-subscribe model and connected to the LAN and is received by at least one device of the plurality of devices that is subscribed to receive data related to the event information;

identifying, by the mobile device, event information comprising a current network parameter in relation to a service provided by the mobile device via at least one of the WAN or the LAN; and generating and publishing, using the publish-subscribe model, an indication related to the current network parameter, wherein a second device of the plurality of devices implementing the publish-subscribe model receives the indication based on being subscribed to data published for the service being provided by the mobile device, and the second device is caused to perform an action based at least in part on the indication, wherein the action comprises reducing an amount of bandwidth being used to provide a service via the second device in the LAN, and wherein the mobile device is transitioning from providing the service via a cellular network to providing the service in the LAN, and a portion of the bandwidth previously used by the second device prior to the reducing is allocated to the mobile device.

7. The method of claim 1, further comprising:

accessing a database comprising historical data in relation to the plurality of devices connected to the LAN, wherein the historical data comprises previous indications published using the publish-subscribe model, wherein the action is performed further based at least in part on a portion of the historical data related to the second device and a service provided by the second device.

8. The method of claim 7, wherein networking equipment is provided by a first entity, the second device is provided by a second entity, and the database is a distributed ledger, and wherein writing to the distributed ledger by the first entity or the second entity requires use of a consensus algorithm.

9. A system, comprising:

control circuitry configured to:

identify networking equipment connected to a local area network (LAN) at a location, wherein the LAN transmits data to and receives data from a wide area network (WAN), and wherein the networking equipment implements a publish-subscribe model in which event information related to at least one of the WAN or the LAN is published by a device of a plurality of devices implementing the publish-subscribe model and connected to the LAN and is received by at least one device of the plurality of devices that is subscribed to receive data related to the event information, and wherein the LAN is provided at least in part by the networking equipment;

identify, by the networking equipment, event information comprising a current network parameter in relation to a service provided by the networking equipment via at least one of the WAN or the LAN; and generate and publish, using the publish-subscribe model, an indication related to the current network parameter, wherein a second device of the plurality of devices implementing the publish-subscribe model receives the indication based on being subscribed to data published for the service being provided by the networking equipment, and the second device is caused to perform an action based at least in part on the indication, wherein the indication comprises at least one of:

an indication that a signal strength between the networking equipment and the second device is below a threshold;

an indication that an error is causing an interruption to a service provided by the second device via at least one of the WAN or the LAN; or an indication of at least one of a bandwidth or a latency associated with at least one of the LAN or the WAN.

10. The system of claim 9, wherein the indication comprises the indication of the error that is causing the interruption to the service provided by the second device via at least one of the WAN or the LAN, and the action comprises causing display of a description of the error.

11. The system of claim 9, wherein the action comprises reducing an amount of bandwidth being used to provide a service via the second device in the LAN.

12. The system of claim 11, wherein the indication related to the current network parameter further indicates that the service being provided by the networking equipment is time-sensitive, and a portion of the bandwidth previously used by the second device prior to the reducing is allocated to the networking equipment.

13. The system of claim 11, wherein the service being provided by the networking equipment is treated preferentially as compared to the service being provided by the second device based at least in part on a preference of a user associated with the location.

14. The system of claim 9, wherein the control circuitry is further configured to:

access a database comprising historical data in relation to the plurality of devices connected to the LAN, wherein the historical data comprises previous indications published using the publish-subscribe model, wherein the action is performed further based at least in part on a portion of the historical data related to the second device and a service provided by the second device.

15. The method of claim 1, wherein the indication comprises the indication that the signal strength between the networking equipment and the second device is below the threshold.

16. The method of claim 1, wherein the indication comprises the indication of the error that is causing the interruption to the service provided by the second device via at least one of the WAN or the LAN.

17. The method of claim 1, wherein the indication comprises the indication of at least one of a bandwidth or a latency associated with at least one of the LAN or the WAN.

18. The system of claim 9, wherein the indication comprises the indication that the signal strength between the networking equipment and the second device is below the threshold.

19. The system of claim 9, wherein the indication comprises the indication of the error that is causing the interruption to the service provided by the second device via at least one of the WAN or the LAN.

20. The system of claim 9, wherein the indication comprises the indication of at least one of a bandwidth or a latency associated with at least one of the LAN or the WAN.

* * * * *